(12) United States Patent
Huh et al.

(10) Patent No.: US 11,551,699 B2
(45) Date of Patent: Jan. 10, 2023

(54) VOICE INPUT AUTHENTICATION DEVICE AND METHOD

(71) Applicant: SAMSUNG ELECTRONICS CO., LTD., Suwon-si (KR)

(72) Inventors: Junho Huh, Suwon-si (KR); Hyoungshik Kim, Suwon-si (KR); Muhammad Ejaz Ahmed, Suwon-si (KR); Ilyoup Kwak, Suwon-si (KR); Iljoo Kim, Suwon-si (KR); Sangjoon Je, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/052,736

(22) PCT Filed: Apr. 30, 2019

(86) PCT No.: PCT/KR2019/005174
§ 371 (c)(1),
(2) Date: Nov. 3, 2020

(87) PCT Pub. No.: WO2019/212221
PCT Pub. Date: Nov. 7, 2019

(65) Prior Publication Data
US 2021/0174813 A1    Jun. 10, 2021

Related U.S. Application Data

(60) Provisional application No. 62/667,096, filed on May 4, 2018.

(30) Foreign Application Priority Data

Aug. 7, 2018 (KR) .................. 10-2018-0092046

(51) Int. Cl.
*G10L 17/22* (2013.01)
*G06F 21/32* (2013.01)
(Continued)

(52) U.S. Cl.
CPC ............. *G10L 17/22* (2013.01); *G06F 21/32* (2013.01); *G06F 21/45* (2013.01); *G10L 17/02* (2013.01);
(Continued)

(58) Field of Classification Search
None
See application file for complete search history.

(56) References Cited

U.S. PATENT DOCUMENTS 7,404,087 B2   7/2008   Teunen
8,457,974 B2   6/2013   Wang
(Continued)

FOREIGN PATENT DOCUMENTS

JP   2002-23792 A    1/2002
JP   2017-187676 A   10/2017
(Continued)

OTHER PUBLICATIONS

Lavrentyeva, Galina, et al. "Audio Replay Attack Detection with Deep Learning Frameworks." Interspeech. 2017. (Year: 2017).*
(Continued)

*Primary Examiner* — Douglas Godbold
(74) *Attorney, Agent, or Firm* — Sughrue Mion, PLLC

(57) ABSTRACT

Provided are a method of authenticating a voice input provided from a user and a method of detecting a voice input having a strong attack tendency. The voice input authentication method includes: receiving the voice input; obtaining, from the voice input, signal characteristic data representing signal characteristics of the voice input; and authenticating the voice input by applying the obtained signal characteristic
(Continued)

data to a first learning model configured to determine an attribute of the voice input, wherein the first learning model is trained to determine the attribute of the voice input based on a voice uttered by a person and a voice output by an apparatus.

18 Claims, 16 Drawing Sheets

(51) Int. Cl.
    *G06F 21/45*     (2013.01)
    *G10L 17/02*     (2013.01)
    *G10L 17/04*     (2013.01)
    *G10L 17/06*     (2013.01)
    *G10L 25/21*     (2013.01)

(52) U.S. Cl.
    CPC .............. *G10L 17/04* (2013.01); *G10L 17/06* (2013.01); *G10L 25/21* (2013.01)

(56) References Cited

U.S. PATENT DOCUMENTS

| | | | |
|---|---|---|---|
| 8,494,854 | B2 | 7/2013 | Gross |
| 9,020,823 | B2 | 4/2015 | Hoepken et al. |
| 9,865,253 | B1 | 1/2018 | De Leon et al. |
| 9,972,323 | B2 | 5/2018 | Foerster et al. |
| 10,079,024 | B1* | 9/2018 | Bhimanaik ............. G10L 17/06 |
| 10,366,709 | B2 | 7/2019 | Kaneko |
| 10,417,405 | B2 | 9/2019 | Cheyer |
| 10,706,856 | B1* | 7/2020 | Korjani ................... G10L 17/02 |
| 10,735,411 | B1* | 8/2020 | Hardt ...................... H04W 4/02 |
| 11,176,960 | B2* | 11/2021 | Traynor .............. G10L 21/0316 |
| 2001/0039619 | A1 | 11/2001 | Lapere et al. |
| 2012/0296651 | A1* | 11/2012 | Wang ...................... G06F 21/31 704/249 |
| 2014/0222436 | A1 | 8/2014 | Binder et al. |
| 2017/0200451 | A1* | 7/2017 | Booklet .................. G10L 17/02 |
| 2017/0345430 | A1* | 11/2017 | Foerster ................. G10L 17/06 |
| 2018/0254046 | A1* | 9/2018 | Khoury ................... G10L 17/00 |
| 2018/0293367 | A1* | 10/2018 | Urman .................... G06F 21/32 |
| 2019/0147888 | A1* | 5/2019 | Lesso ...................... G10L 17/06 340/5.84 |
| 2019/0149932 | A1* | 5/2019 | Lesso ...................... G10L 25/78 381/56 |
| 2021/0125619 | A1* | 4/2021 | Lopez Espejo ......... G06F 21/32 |
| 2021/0166715 | A1* | 6/2021 | Bharitkar ................ G10L 17/04 |

FOREIGN PATENT DOCUMENTS

| | | |
|---|---|---|
| KR | 10-0611562 B1 | 8/2006 |
| KR | 10-1201151 B1 | 11/2012 |
| KR | 10-2013-0133026 A | 12/2013 |
| KR | 10-2014-0086559 A | 7/2014 |
| KR | 10-2016-0105496 A | 9/2016 |
| KR | 10-2016-0148009 A | 12/2016 |

OTHER PUBLICATIONS

International Search Report (PCT/ISA/210) dated Aug. 7, 2019 issued by the International Searching Authority in International Application No. PCT/KR2019/005174.

Written Opinion (PCT/ISA/237) dated Aug. 7, 2019 issued by the International Searching Authority in counterpart International Application No. PCT/KR2019/005174.

Communication dated Sep. 23, 2022 issued by the Korean Intellectual Property Office in Korean Patent Application No. 10-2018-0092046.

* cited by examiner

VOICE INPUT AUTHENTICATION DEVICE AND METHOD

TECHNICAL FIELD

The present disclosure relates to a device and method for authenticating a voice input, and more particularly, to a device and method for authenticating a voice input based on signal characteristics of the voice input.

BACKGROUND ART

An artificial intelligence (AI) system is a computer system that implements human-level intelligence. Unlike an existing rule-based smart system, the AI system is a system that performs machine learning and problem solving by itself and becomes intelligent. As the use of AI systems has increased, a recognition rate thereof has been improved and a user's preference may be understood more accurately. The existing rule-based smart system is gradually being replaced with a deep learning-based AI system.

AI technology includes machine learning (deep learning) and element technologies using machine learning. Machine learning is an algorithm technology for classifying and learning characteristics of input data by itself. The element technology is a technology using a machine learning algorithm such as deep learning. The element technology includes technical fields such as linguistic understanding, visual understanding, inference or prediction, knowledge representation, and motion control.

Various fields to which AI technology is applied are as follows. Linguistic understanding is a technology for recognizing, applying, and processing human languages and characters and includes natural language processing, machine translation, dialogue system, query and answering, speech recognition and synthesis, and the like. Visual understanding is a technology for recognizing and processing objects like human vision and includes object recognition, object tracking, image retrieval, person recognition, scene understanding, spatial understanding, image enhancement, and the like. Inference or prediction is a technology for determining, logically inferring, and predicting information and includes knowledge/probability-based inference, optimization prediction, preference-based planning, recommendation, and the like. Knowledge representation is a technology for automatically processing human experience information into knowledge data and includes knowledge construction (data generation and classification), knowledge management (data utilization), and the like. Motion control is a technology for controlling autonomous driving of vehicles and movements of robots and includes movement control (navigation, collision avoidance, driving, etc.), operation control (behavior control), and the like.

As AI technology has advanced, users have become able to operate or use various devices or services through voice inputs. Therefore, the importance of security and authentication for the voice inputs provided by the users is emerging.

DESCRIPTION OF EMBODIMENTS

Technical Problem

Some embodiments may provide a device and method for authenticating a voice input by using a learning model capable of discriminating whether a voice input is uttered by a person or whether a voice input is output by an apparatus, based on signal characteristic data.

Also, some embodiments may provide a device and a method for authenticating a user by using a learning model capable of authenticating a user based on a voice input pattern.

Also, some embodiments may provide a device and a method for authenticating a user by using a learning model capable of additionally authenticating a user through a query and answering process.

Technical Solution to Problem

As a technical means for achieving the above-described technical problem, a voice input authentication device according to an embodiment of the present disclosure includes: a microphone configured to receive the voice input; a memory configured to store one or more instructions; and a processor configured to execute the one or more instructions, wherein the processor is further configured to execute the one or more instructions to obtain, from the voice input, signal characteristic data representing signal characteristics of the voice input, and authenticate the voice input by applying the obtained signal characteristic data to a first learning model configured to determine an attribute of the voice input, and the first learning model is trained to determine the attribute of the voice input based on a voice uttered by a person and a voice output by an apparatus.

Also, a voice input authentication method according to an embodiment of the present disclosure includes: receiving the voice input; obtaining, from the voice input, signal characteristic data representing signal characteristics of the voice input; and authenticating the voice input by applying the obtained signal characteristic data to a first learning model configured to determine an attribute of the voice input, wherein the first learning model is trained to determine the attribute of the voice input based on a voice uttered by a person and a voice output by an apparatus.

Also, a computer-readable recording medium according to an embodiment of the present disclosure may be a computer-readable recording medium having recorded thereon a program for executing the above-described method.

Advantageous Effects of Disclosure

According to a device and method for authenticating a voice input, according to the present disclosure, an attack by an external attacker on the voice input may be more effectively prevented.

BRIEF DESCRIPTION OF DRAWINGS

The present disclosure may be easily understood by combining the following detailed description and the accompanying drawings, and reference numerals refer to structural elements.

BEST MODE

Figure 1:
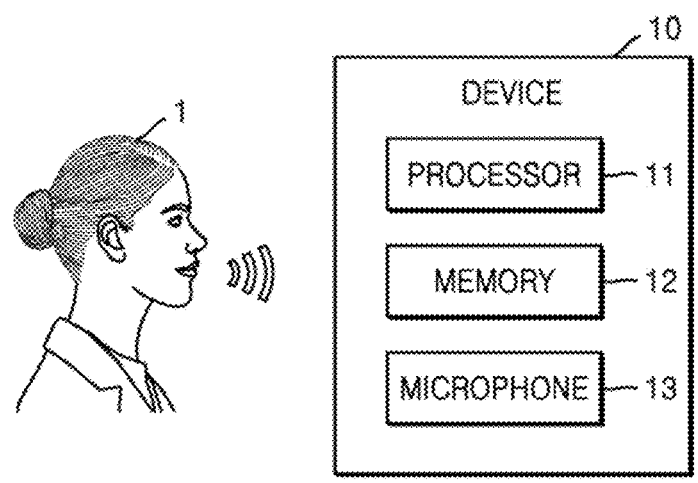
FIG. 1 is a block diagram of a device according to some embodiments.

A voice input authentication method according to an embodiment of the present disclosure includes: receiving the voice input; obtaining, from the voice input, signal characteristic data representing signal characteristics of the voice input; and authenticating the voice input by applying the obtained signal characteristic data to a first learning model configured to determine an attribute of the voice input, wherein the first learning model is trained to determine the attribute of the voice input based on a voice uttered by a person and a voice output by an apparatus.

Mode of Disclosure

Hereinafter, embodiments of the present disclosure will be described in detail with reference to the accompanying drawings so that the present disclosure may be easily carried out by those of ordinary skill in the art. However, the present disclosure may be embodied in many different forms and is not limited to the embodiments described herein. Also, in order to clearly describe the present disclosure, parts having no relation to the description are omitted, and like reference numerals are assigned to like elements throughout the specification.

Some embodiments of the present disclosure may be represented by functional block configurations and various processing operations. All or part of such functional blocks may be implemented by any number of hardware and/or software elements configured to perform particular functions. For example, the functional blocks of the present disclosure may be implemented as one or more microprocessors or may be implemented as circuit configurations for certain functions. Also, for example, the functional blocks of the present disclosure may be implemented with various programming or scripting languages. The functional blocks may be implemented as algorithms that are executed on one or more processors. Also, the present disclosure may employ any conventional techniques for electronic environment configuration, signal processing, and/or data processing.

Also, the connecting lines or connecting members illustrated in the drawings are intended to represent exemplary functional connections and/or physical or logical connections between elements. In a real device, connections between elements may be represented by various functional connections, physical connections, or circuit connections, which are replaceable or added.

Also, the terms "-er/or" and "module" as used herein represent a unit for processing at least one function or operation, which may be implemented by hardware, software, or a combination thereof. The terms "-er/or" and "module" may be implemented by a program that is stored in an addressable storage medium and is executable by a processor.

The embodiments of the present disclosure, which are described in this specification and drawings, are merely presented as specific examples so as to easily explain the technical contents of the present disclosure and help the understanding of the present disclosure and are not intended to limit the scope of the present disclosure. That is, it will be obvious to those of ordinary skill in the art that other modifications based on the technical idea of the present disclosure may be made. Also, the respective embodiments may be operated in combination with each other as necessary. For example, some portions of one embodiment of the present disclosure and some portions of another embodiment of the present disclosure may be combined with each other so that the device may be operated.

FIG. 1 is a block diagram of a device according to some embodiments.

Referring to FIG. 1, a device 10 includes a processor 11, a memory 12, and a microphone 13.

A user 1 may provide a voice input to the device 10. The voice input may be a voice uttered by the user 1 and may include text information. The user 1 may control the device 10 or an electronic device connected thereto by using the voice input. The voice input may be provided in various forms and languages. For example, the user 1 may utter the voice input such as "Device! Confirm a newly received mail."

The device 10 may receive the voice input by using the microphone 13. In this case, the microphone 13 may receive the voice input by converting ambient sound into electrical data. In an embodiment, the device 10 may include a plurality of microphones 13. The microphone 13 may provide the received voice input to the processor 11.

The processor 11 controls overall operations of the device 10. The processor 11 may be configured to process at least one instruction by performing basic arithmetic, logic, and input/output operations. The at least one instruction may be provided from the memory 12 to the processor 11. That is, the processor 11 may be configured to execute the at least one instruction according to a program code stored in a recording device such as the memory 12. Alternatively, the device 10 may receive the at least one instruction through a communication module (not illustrated) and provide the received at least one instruction to the processor 11.

The processor 11 may authenticate the received voice input and control the device 10 or the electronic device connected thereto by using the voice input, based on a result of the authenticating. For example, when a voice input of "Bixby! Check newly received mail" is authenticated, the processor 11 may control the device 10 to check the newly received mail.

The processor 11 may reject the user 1 from controlling the device 10 or the electronic device connected thereto by using an unauthenticated voice input. For example, when the voice input of "Bixby! Check newly received mail" is not authenticated, the processor 11 may not perform the mail check operation of the device 10.

In an embodiment, the processor 11 may obtain signal characteristic data from the voice input. The signal characteristic data is data representing electrical signal characteristics of the voice input. In an embodiment, the signal characteristic data may be data analyzed based on at least one of a frequency, time, or power of the voice input. The processor 11 may authenticate the voice input by applying the signal characteristic data to a first learning model.

More specifically, the processor 11 may determine an attribute of the voice input by applying the signal characteristic data to the first learning model. In an embodiment, the attribute of the voice input may indicate whether the voice input is uttered by a person, or whether the voice input is output by an apparatus. In the present disclosure, the voice input uttered by the person refers to a voice that is uttered through a person's vocal cords. In the present disclosure, the voice input output by the apparatus refers to a voice that is electronically synthesized or recorded and output through a speaker, a recorder, a playback device, or the like. The processor 11 may use the attribute of the voice input to determine whether the received voice input is due to a user, or whether the received voice input is due to an external attack using an apparatus.

In an embodiment, the processor 11 may determine the attribute of the voice input and the reliability of the determined attribute of the voice input by applying the signal characteristic data to the first learning model. The reliability may be a probability that the determined attribute of the voice input will match an actual attribute. The reliability may be determined in various forms. For example, the processor 11 may determine that the voice input is uttered by a person with 90% reliability. Alternatively, the processor 11 may determine that the voice input is output by the apparatus with reliability corresponding to a specific operation among predefined operations.

The processor 11 may authenticate the voice input based on the determined attribute of the voice input. For example, the processor 11 may authenticate the voice input when the processor 11 determines that the voice input is uttered by the person. The processor 11 may not authenticate the voice input when the processor 11 determines that the voice input is output by the apparatus.

Based on the reliability, it may be difficult for the processor 11 to determine whether the voice input is uttered by the person, or whether the voice input is output by the apparatus. In this case, the processor 11 may determine whether a first user authentication is required, based on the determined reliability.

When the processor 11 determines that the first user authentication is required, the processor 11 authenticates the user by applying the voice input to a second learning model.

The first user authentication is an operation of authenticating the user who utters the voice input, based on a voice input pattern of the user. In the present disclosure, the voice input pattern may be a pattern determined based on a voice input which is input by a user or a situation in which a voice input is input, so as to control the device. For example, the voice input pattern may represent a user's usage behavior of inputting voice through the processor 11. The processor 11 may apply the voice input to the second learning model and reject authentication for a user who attempts abnormal use.

In an embodiment, the processor 11 may provide context information to the second learning model so as to train the second learning model based on the voice input pattern.

The context information may include at least one of surrounding environment information of the device 10, state information of the device 10, user state information, user's usage history information of the device 10, and user schedule information, but the present disclosure is not limited thereto.

When the authentication for the user, which is performed by the first user authentication, is rejected or difficult to determine, the processor 11 may determine that a second user authentication is required. When the processor 11 determines that the second user authentication is required, the processor 11 may additionally authenticate the user.

The second user authentication is an operation of authenticating the user who utters the voice input by using an additional input provided from the user. In an embodiment, the processor 11 may additionally authenticate the user based on a cipher text received from the user. In another embodiment, the processor 11 may additionally authenticate the user by using a third learning model configured to authenticate the user through a query and answering process. In another embodiment, the processor 11 may additionally authenticate the user by using biometric recognition such as fingerprint recognition or face recognition.

The device 10 may be a smartphone, a tablet personal computer (PC), a PC, a smart television (TV), a mobile phone, a personal digital assistant (PDA), a laptop computer, a media player, a micro server, a global positioning system (GPS) device, an e-book terminal, a digital broadcasting terminal, a navigation, a kiosk, an MP3 player, a digital camera, a home appliance, and other mobile or non-mobile computing devices, but the present disclosure is not limited thereto. Also, the device 10 may be a wearable device, such as a watch, glasses, a hair band, or a ring, which has a communication function and a data processing function. However, the present disclosure is not limited thereto, and the device 10 may include all types of devices capable of receiving a voice input from the user 1 and authenticating the received voice input.

Also, the device 10 may communicate with a server and other devices (not illustrated) via a certain network so as to use various pieces of context information. In this case, the network may include a local area network (LAN), a wide area network (WAN), a value added network (VAN), a mobile radio communication network, a satellite communication network, or any combinations thereof. The network may be a comprehensive data communication network that enables network configuration entities to efficiently communicate with each other and may include a wired Internet, a wireless Internet, and a mobile wireless communication network. Examples of the wireless communication may include wireless LAN (Wi-Fi), Bluetooth, Bluetooth Low Energy, Zigbee, Wi-Fi Direct (WFD), ultra wideband (UWB), infrared communication (Infrared Data Association (IrDA)), and Near Field Communication (NFC), but the present disclosure is not limited thereto.

Figure 2:
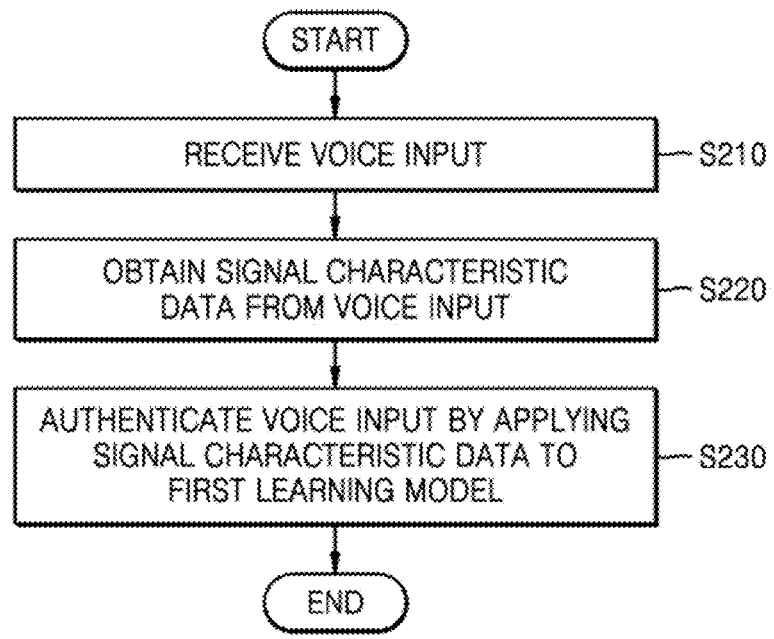
FIG. 2 is an exemplary flowchart for describing a method, performed by a device, of authenticating a voice input, according to some embodiments.

FIG. 2 is an exemplary flowchart for describing a method, performed by a device, of authenticating a voice input, according to some embodiments.

In operation S210, a device 10 may receive a voice input. The device 10 may receive a voice input provided from a user by using at least one microphone.

In operation S220, the device 10 may obtain signal characteristic data from the voice input. The signal characteristic data may be data representing electrical signal characteristics of the voice input. In an embodiment, the signal characteristic data may be data analyzed based on at least one of a frequency, time, or power of the voice input. For example, the signal characteristic data may include a spectrogram or per-frequency cumulative power of the voice input. However, this is an example, and the type of signal characteristic data of the present disclosure is not limited to the above-described type.

In operation S230, the device 10 may authenticate the voice input by applying the signal characteristic data to a first learning model.

More specifically, the device 10 may determine an attribute of the voice input by applying the signal characteristic data to the first learning model. In an embodiment, the attribute of the voice input may indicate whether the voice input is uttered by a person, or whether the voice input is output by an apparatus. The device 10 may use the attribute of the voice input to determine whether the received voice input is due to a user, or whether the received voice input is due to an external attack using an apparatus.

In an embodiment, the device 10 may determine the attribute of the voice input and the reliability of the determined attribute of the voice input by applying the signal characteristic data to the first learning model. The reliability may be determined in various forms.

In an embodiment, the device 10 may authenticate the voice input based on the determined attribute of the voice input and the reliability thereof. For example, when the device 10 determines that the voice input is uttered by the person, the device 10 may compare the reliability with a threshold value stored in a memory. The device 10 may authenticate the voice input based on a result of the comparing. Alternatively, when the device 10 determines that the voice input is output by the apparatus, the device 10 may compare the reliability with the threshold value stored in the memory and may not authenticate the voice input based on a result of the comparing.

The first learning model may be preset and stored in the device 10. In this case, a server that generates and operates the first learning model may provide the first learning model to the device 10, and the device 10 may store the first learning model received from the server in the device 10 and manage the first learning model.

Also, the preset first learning model may be stored in the server. In this case, the device 10 may provide the signal characteristic data to the server and receive, from the server, the attribute of the voice input determined based on the signal characteristic data.

The preset first learning model may be a learning model that is trained by using at least one artificial intelligence (AI) algorithm among machine learning algorithms, neural network algorithms, genetic algorithms, deep learning algorithms, and classification algorithms.

In an embodiment, the preset first learning model may be pre-trained to determine the attribute of the voice input based on the voice uttered by the person and the voice output by the apparatus. For example, a plurality of voices including voices of various lengths and contents uttered by a user and voices output by various apparatuses may be provided, and the preset first learning model may be trained by using signal characteristic data obtained from the provided voices as training data.

Figure 3:
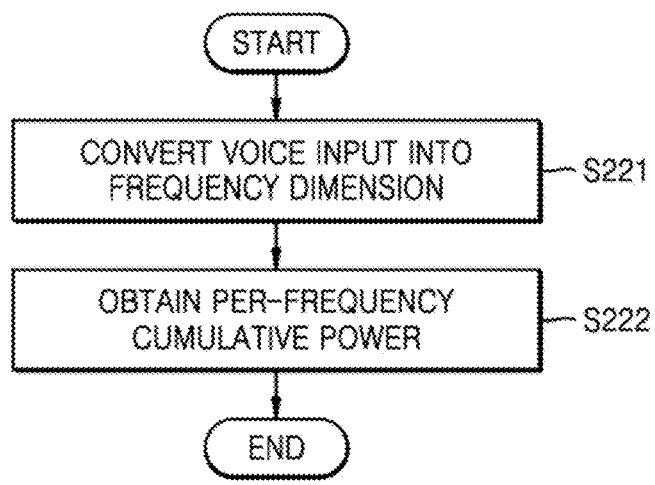
FIG. 3 is an exemplary flowchart for describing a method, performed by a device, of obtaining signal characteristic data, according to some embodiments.

FIG. 3 is an exemplary flowchart for describing a method, performed by a device, of obtaining signal characteristic data, according to some embodiments. In an embodiment, the signal characteristic data includes information about a per-frequency cumulative power.

In operation S221, the device 10 may convert the voice input into a frequency dimension. In an embodiment, the device 10 may obtain a spectrogram of the voice input. The spectrogram may include information about each frequency and power corresponding thereto with respect to the time.

In an embodiment, the device 10 may obtain the spectrogram by using Fourier transform. For example, the device 10 may obtain the spectrogram by using short-time Fourier transform. However, an embodiment of obtaining a spectrogram of a voice input in the present disclosure is not limited to the above-described examples.

In operation S222, the device 10 may obtain information about a per-frequency cumulative power. The spectrogram may include information about each frequency and power corresponding thereto with respect to the time. The device 10 may obtain the information about the per-frequency cumulative power by calculating cumulative power per frequency with respect to a certain time. The certain time may be a time when the voice input is uttered.

FIGS. 4A to 4D are diagrams for describing signal characteristic data by way of example.

Figure 4A:
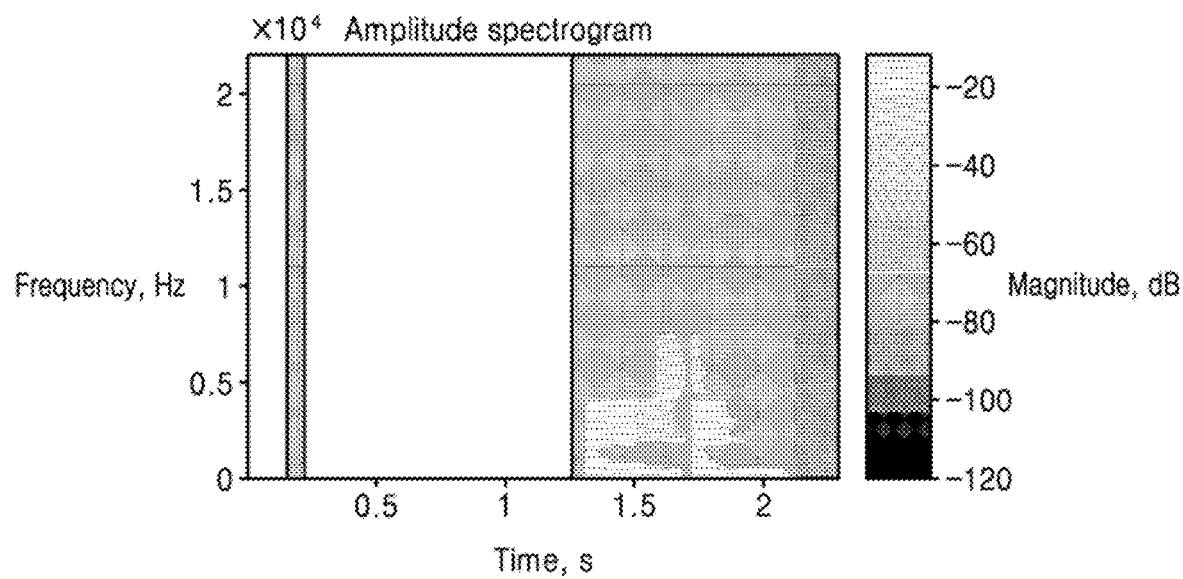
FIGS. 4A to 4D are diagrams for describing signal characteristic data by way of example.
Figure 4B:
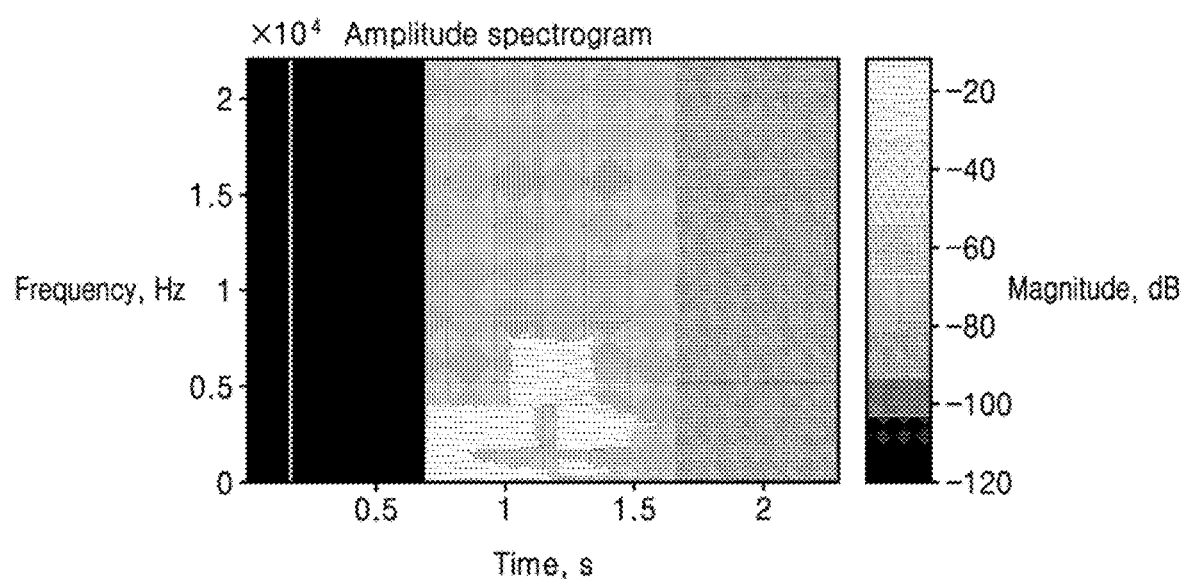

FIG. 4A is a diagram illustrating a spectrogram of a voice uttered by a person. FIG. 4A is a diagram illustrating a spectrogram of a voice output by an apparatus. In each spectrogram, a frequency is expressed in Hz, a time is expressed in sec, and power is expressed in dB.

Figure 4C:
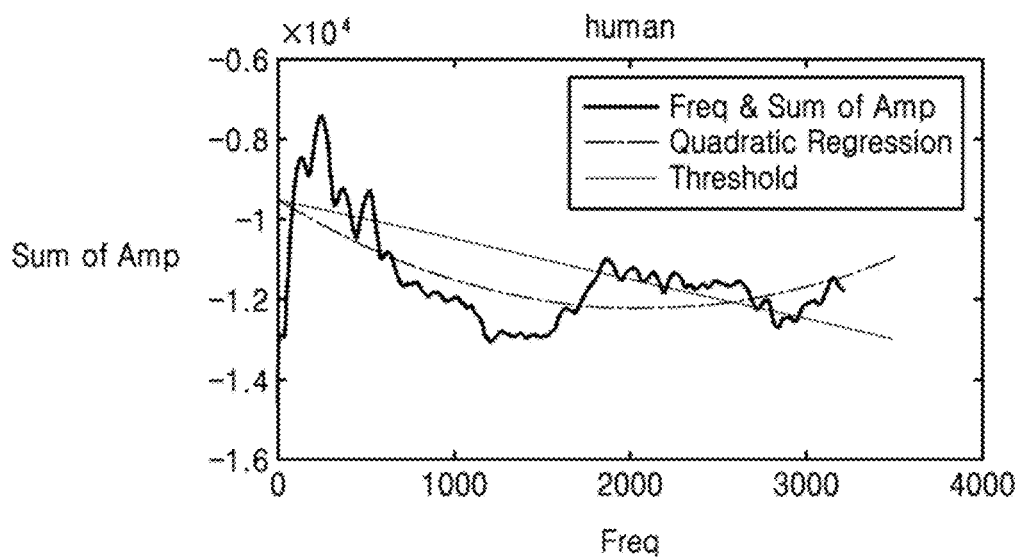
Figure 4D:
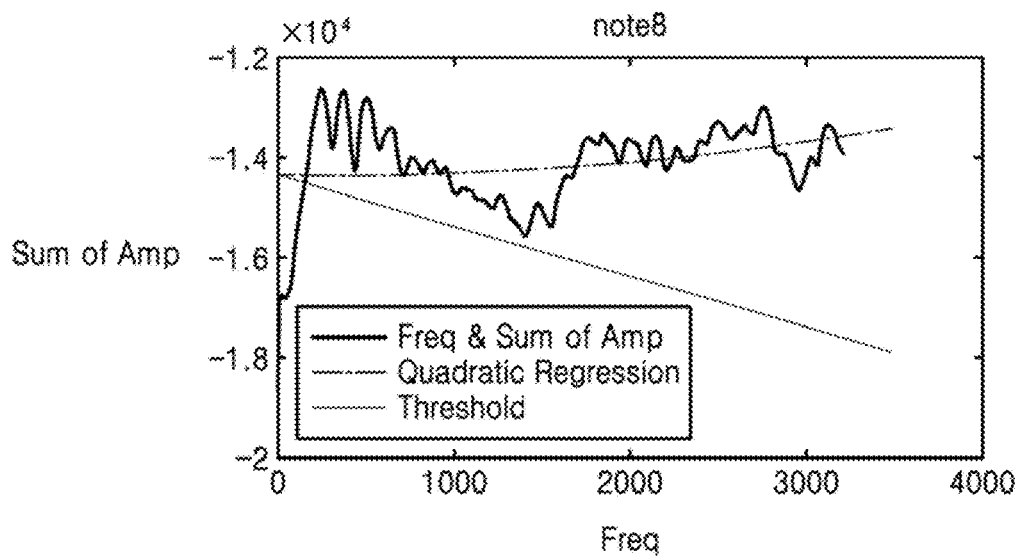

FIG. 4C is a diagram illustrating a per-frequency cumulative power of the voice of FIG. 4A. FIG. 4D is a diagram illustrating a per-frequency cumulative power of the voice of FIG. 4B. The voices used in FIGS. 4A to 4D are an example, and the technical idea of the present disclosure is not limited thereby.

Referring to FIGS. 4A to 4D, a voice uttered by a person and a voice output by an apparatus show different electrical signal characteristics. For example, the voice uttered by the person and the voice output by the apparatus show different attenuation patterns in a per-frequency cumulative power. Also, the power of the voice uttered by the person and the power of the voice output by the apparatus are concentrated in different frequency bands, and the relative magnitudes thereof in a high frequency band and a low frequency band are different from each other.

Therefore, the first learning model may be pre-trained to determine the attribute of the voice input by using the signal characteristic data obtained from each voice, based on the voice uttered by the person and the voice output by the apparatus.

Figure 5:
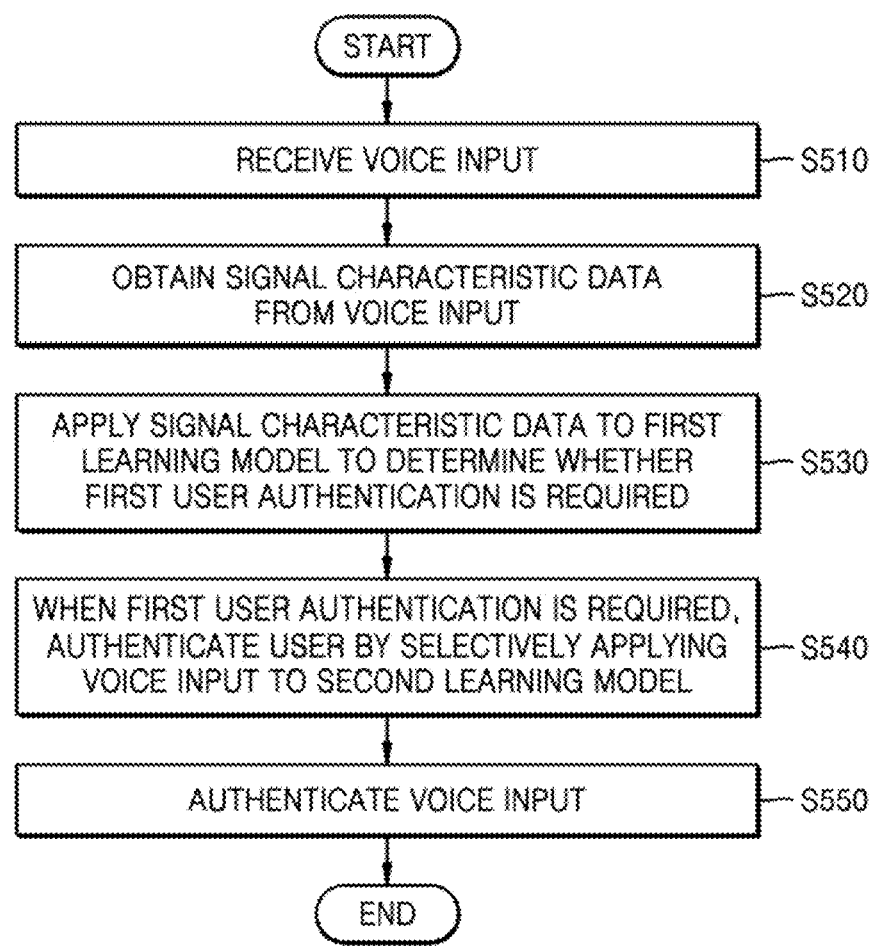
FIG. 5 is an exemplary flowchart for describing a method, performed by a device, of authenticating a voice input, according to some embodiments.

FIG. 5 is an exemplary flowchart for describing a method, performed by a device, of authenticating a voice input, according to some embodiments. Referring to FIG. 5, a device 10 may selectively authenticate a user by using a second learning model.

In operation S510, the device 10 may receive a voice input. The device 10 may receive a voice input provided from a user by using at least one microphone.

In operation S520, the device 10 may obtain signal characteristic data from the voice input. The signal characteristic data is data representing electrical signal characteristics of the voice input. In an embodiment, the signal characteristic data may include a spectrogram or per-frequency cumulative power of the voice input. However, this is an example, and the type of signal characteristic data of the present disclosure is not limited to the above-described type.

In operation S530, the device 10 may apply the signal characteristic data to a first learning model to determine whether a first user authentication is required.

In an embodiment, the device 10 may apply the signal characteristic data to the first learning model to determine an attribute of the voice input and reliability thereof. In an embodiment, the attribute of the voice input may indicate whether the voice input is uttered by a person, or whether the voice input is output by an apparatus.

The device 10 may authenticate the voice input based on the determined attribute of the voice input. For example, the device 10 may authenticate the voice input when the device 10 determines that the voice input is uttered by the person. The device 10 may not authenticate the voice input when the device 10 determines that the voice input is output by the apparatus.

In an embodiment, the device 10 may authenticate the voice input based on the determined reliability. For example, when the device 10 determines that the voice input is output by the person, the device 10 may compare the reliability with a threshold value stored in a memory and may authenticate the voice input based on a result of the comparing. Alternatively, when the device 10 determines that the voice input is output by the apparatus, the device 10 may compare the reliability with the threshold value stored in the memory and may not authenticate the voice input based on a result of the comparing.

Based on the reliability, it may be difficult for the device 10 to determine whether the voice input is uttered by the person, or whether the voice input is output by the apparatus. In this case, the device 10 may determine whether the first user authentication is required, based on the determined reliability. For example, when the determined reliability is within a certain range, for example, 90% or less, the device 10 may determine that the first user authentication is required.

In operation S540, when the device 10 determines that the first user authentication is required, the device 10 may authenticate the user by selectively applying the voice input to a second learning model.

The first user authentication is an operation of authenticating the user who utters the voice input, based on a voice input pattern of the user. In the present disclosure, the voice input pattern may be a pattern determined based on a voice input which is input by a user or a situation in which a voice input is input, so as to control the device. The device 10 may apply the voice input to the second learning model and reject authentication for a user who attempts abnormal use.

In this case, the device 10 may perform the first user authentication by applying the user's voice input and information indicating the current situation to the second learning model.

The second learning model may be a learning model trained based on the voice input pattern of the user. For example, the second learning model may be pre-trained by using, as training data, the users voice input and context information indicating a situation in which the user inputs the voice.

The context information may include at least one of surrounding environment information of the device 10, state information of the device 10, user state information, user's usage history information of the device 10, and user schedule information, but the present disclosure is not limited thereto.

The surrounding environment information of the device 10 refers to environment information within a certain radius from the device 10, and may include weather information, temperature information, humidity information, illumination information, noise information, sound information, time information, and the like. For example, when the voice input is provided from the user in a place different from a trained place, the second learning model may be trained so that the user who utters the voice input is not authenticated. Alternatively, the second learning model may be trained so that the user is not authenticated when the voice input is provided from the user at a time different from a trained time. However, data for training the second learning model is not limited thereto.

The state information of the device 10 may include mode information indicating an operation mode of the device 10 (e.g., a sound mode, a vibration mode, a silent mode, a power-saving mode, a blocking mode, a multi-window mode, an automatic rotation mode, etc.), location information of the device 10, time information, communication module activation information (e.g., Wi-Fi ON/Bluetooth OFF/GPS ON/NFC ON, etc.), network connection state information of the device 10, information about applications executed in the device 10 (e.g., application identification information, application type, application use time, application use cycle, etc.), and the like.

The user state information is information about a users characteristics, movement, and life pattern, and the like, and may include information about a user's gender, a user's walking state, exercising state, driving state, and sleeping state, a user's mood state, and the like. For example, the second learning model may be trained so that the user is not authenticated when a gesture that the user does not frequently use is recognized during voice input. However, the user state information included in the context information is not limited thereto.

The user's usage history information of the device 10 is information about a user's usage history of the device 10, and may include execution history of an application, a history of functions executed in the application, a user's call history, a user's text history, a frequency of words included in the voice input, an average number of uses of the voice input, an average time between actions in which the user uses the voice input, and the like.

The user schedule information is information about a user's past schedule and prearranged schedule. The schedule information may be provided by a user's prior input. Alternatively, the device 10 may receive the schedule information from a server or other electronic devices connected via a network.

When the user is authenticated, context information to be used may be determined according to learning based on a preset criterion. For example, supervised learning that uses a certain voice input and certain context information as input values and unsupervised learning that discovers a user authentication pattern by self-learning a type of context information necessary for authenticating a user without separate supervision may be used for user authentication. Also, for example, reinforcement learning that uses a feedback on whether a result of grasping the user's intention according to learning is correct may be used for user authentication.

The device 10 may perform speech-to-text (SST) conversion on the voice input. The device 10 may extract a user command from the voice input converted through the STT. The device 10 may apply at least one of a language, type, length, and contents of the extracted user command to the second learning model.

In operation S550, the device 10 authenticates the voice input based on a result of the user authentication. For example, when the user is authenticated, the device 10 may authenticate the voice input even when the attribute of the voice input is determined with low reliability. When the user is not authenticated, the device 10 may not authenticate the voice input.

Figure 6:
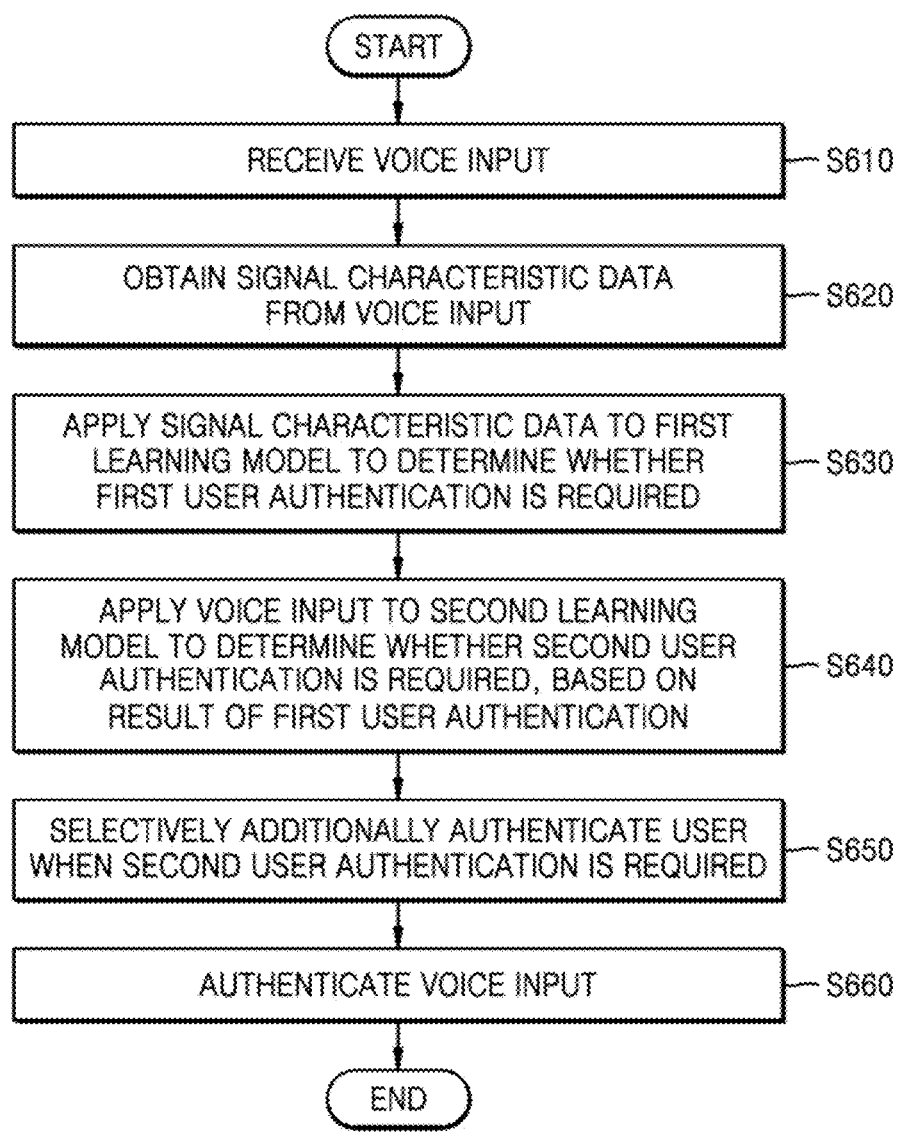
FIG. 6 is an exemplary flowchart for describing a method, performed by a device, of authenticating a voice input, according to some embodiments.

FIG. 6 is an exemplary flowchart for describing a method, performed by a device, of authenticating a voice input, according to some embodiments. Referring to FIG. 6, a device 10 may selectively additionally authenticate the user.

In operation S610, the device 10 may receive a voice input. The device 10 may receive a voice input provided from a user by using at least one microphone.

In operation S620, the device 10 may obtain signal characteristic data from the voice input. In an embodiment, the signal characteristic data may include a spectrogram or per-frequency cumulative power of the voice input. However, this is an example, and the type of signal characteristic data of the present disclosure is not limited to the above-described type.

In operation S630, the device 10 may apply the signal characteristic data to a first learning model to determine whether a first user authentication is required.

In an embodiment, the device 10 may apply the signal characteristic data to the first learning model to determine an attribute of the voice input and the reliability thereof. In an embodiment, the attribute of the voice input may indicate whether the voice input is uttered by a person, or whether the voice input is output by an apparatus.

The device 10 may authenticate the voice input based on the determined attribute of the voice input. For example, the device 10 may authenticate the voice input when the device 10 determines that the voice input is uttered by the person. The device 10 may not authenticate the voice input when the device 10 determines that the voice input is output by the apparatus.

In an embodiment, the device 10 may authenticate the voice input based on the determined reliability. Based on the reliability, it may be difficult for the device 10 to determine whether the voice input is uttered by the person, or whether the voice input is output by the apparatus. In this case, the device 10 may determine whether the first user authentication is required, based on the determined reliability.

In operation S640, when the device 10 determines that the first user authentication is required, the device 10 may apply the voice input to a second learning model to determine whether a second user authentication is required.

The first user authentication is an operation of authenticating the user who utters the voice input, based on a user's voice input pattern. In the present embodiment, the voice input pattern represents a user's usage behavior of using the voice input through the device 10. The device 10 may apply the voice input to the second learning model and reject authentication for a user who attempts abnormal use. When the authentication for the user, which is performed by the first user authentication, is rejected or difficult to determine, the device 10 may determine that the second user authentication is required.

In operation S650, when the device 10 determines that the second user authentication is required, the device 10 may additionally authenticate the user.

The second user authentication is an operation of authenticating the user who utters the voice input by using an additional input provided from the user. In an embodiment, the device 10 may additionally authenticate the user based on a cipher text received from the user. In another embodiment, the device 10 may additionally authenticate the user by using a third learning model configured to authenticate the user through a query and answering process. In another embodiment, the device 10 may additionally authenticate the user by using biometric recognition such as fingerprint recognition or face recognition.

In operation S660, the device 10 may authenticate the voice input based on a result of the additional user authentication. For example, when the user is additionally authenticated, the device 10 may authenticate the voice input. When the user is not authenticated, the device 10 may not authenticate the voice input.

Figure 7:
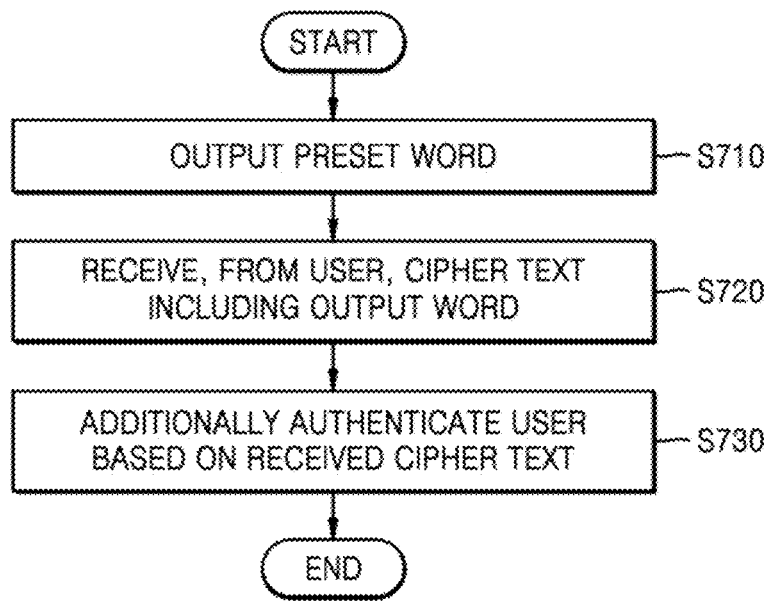
FIG. 7 is an exemplary flowchart for describing a method, performed by a device, of additionally authenticating a user, according to some embodiments.

FIG. 7 is an exemplary flowchart for describing a method, performed by a device, of additionally authenticating a user, according to some embodiments. Referring to FIG. 7, the device 10 may authenticate a user based on a cipher text received from the user.

In operation S710, the device 10 may output a preset word. In an embodiment, the preset word may be a word randomly generated or selected by the device 10. The preset word may be a plurality of words. The words may not be associated with each other. That is, the words may be generated or selected independently of each other. Because the word output from the device 10 is not a word selected by the user, it is difficult to predict the word from an external attacker.

In operation S720, the device 10 may receive, from the user, a cipher text including the output word. For example, when the device 10 outputs "home" and "dog," the cipher text received by the device 10 may be "my home dog."

In operation S730, the device 10 may additionally authenticate the user based on the received cipher text. For example, the device 10 may compare the cipher text received from the user with a preset cipher text and authenticate the user based on a result of the comparing.

Figure 8:
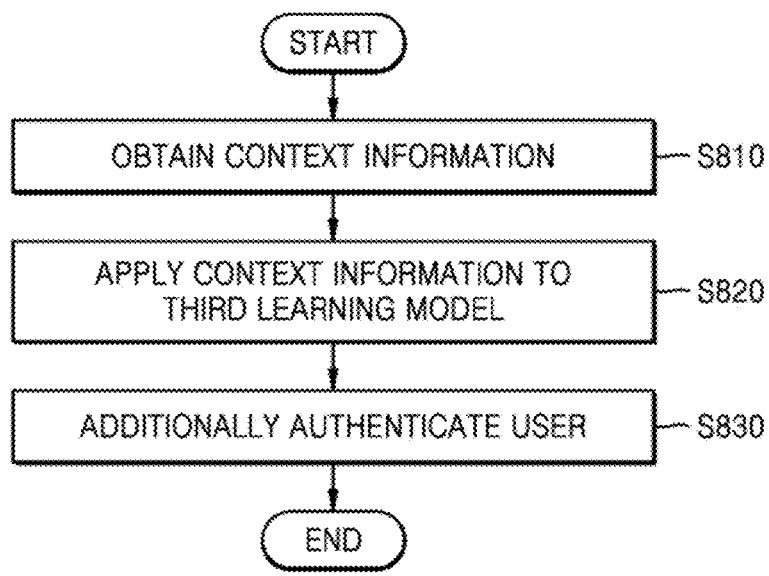
FIG. 8 is an exemplary flowchart for describing a method, performed by a device, of additionally authenticating a user, according to some embodiments.

FIG. 8 is an exemplary flowchart for describing a method, performed by a device, of additionally authenticating a user, according to some embodiments. Referring to FIG. 8, a device 10 may authenticate a user by using a third learning model configured to authenticate the user through a query and answering process.

In operation S810, the device 10 may obtain context information. The context information may include at least one of surrounding environment information of the device 10, state information of the device 10, user state information, users usage history information of the device 10, and user schedule information, but the present disclosure is not limited thereto.

In operation S820, the device 10 may apply the context information to a third learning model configured to authenticate a user through a query and answering process. The device 10 may apply the context information to the third learning model, provide at least one question to the user, and provide an answer received from the user to the third learning model again.

In operation S830, the device 10 may additionally authenticate the user through the query and answering process using the third learning model in operation S820.

Figure 9:
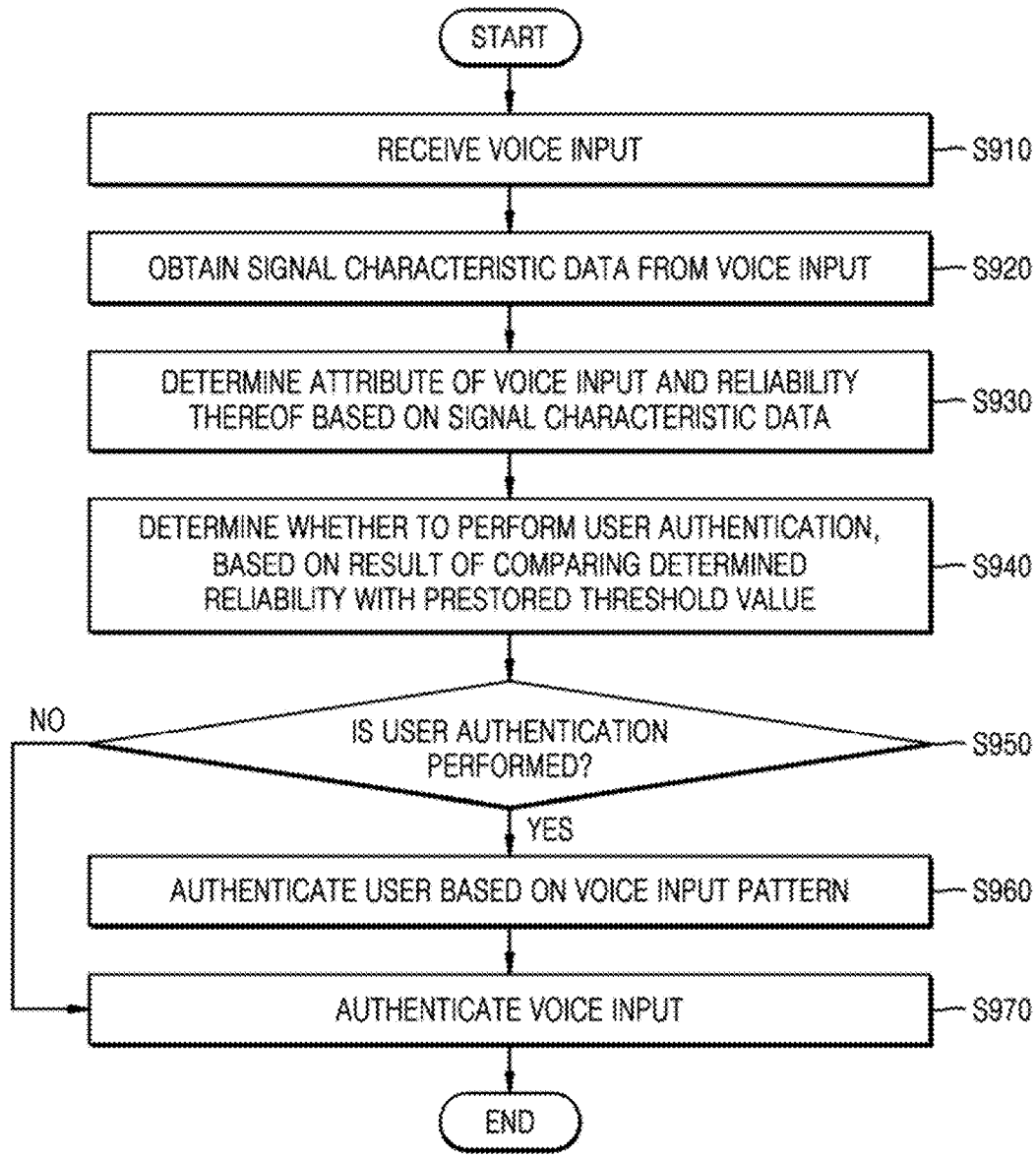
FIG. 9 is an exemplary flowchart for describing a method, performed by a device, of authenticating a voice input, according to some embodiments.

FIG. 9 is an exemplary flowchart for describing a method, performed by a device, of authenticating a voice input, according to some embodiments.

In operation S910, a device 10 may receive a voice input. The device 10 may receive a voice input provided from a user by using at least one microphone.

In operation S920, the device 10 may obtain signal characteristic data from the voice input. The signal characteristic data is data representing electrical signal characteristics of the voice input.

In operation S930, the device 10 may determine an attribute of the voice input and reliability thereof based on the signal characteristic data. In an embodiment, the attribute of the voice input may indicate whether the voice input is uttered by a person, or whether the voice input is output by an apparatus. The reliability may be a probability that the determined attribute of the voice input will match an actual attribute. In an embodiment, the device 10 may apply the signal characteristic data to a first learning model to determine the attribute of the voice input and the reliability thereof. Alternatively, in an embodiment, the device 10 may compare the signal characteristic data with a plurality of pieces of signal characteristic data previously stored in the memory 12 and determine the attribute of the voice input and the reliability thereof.

In operations S940 and S950, the device 10 may determine whether to perform a user authentication, based on a result of comparing the determined reliability with a prestored threshold value. For example, when the determined reliability is less than or equal to the threshold value, the device 10 may determine that the user authentication is required.

In operation S960, when the device 10 determines that the user authentication is required, the device 10 may authenticate the user based on a voice input pattern. In the present embodiment, the voice input pattern represents a user's usage behavior of using the voice input through the device 10. In an embodiment, the device 10 may apply the voice input to a learning model and reject authentication for a user who attempts abnormal use.

In operation S970, the device 10 may authenticate the voice input. For example, when the user is authenticated, the device 10 may authenticate the voice input even when the attribute of the voice input is determined with low reliability. When the user is not authenticated, the device 10 may not authenticate the voice input.

Figure 10:
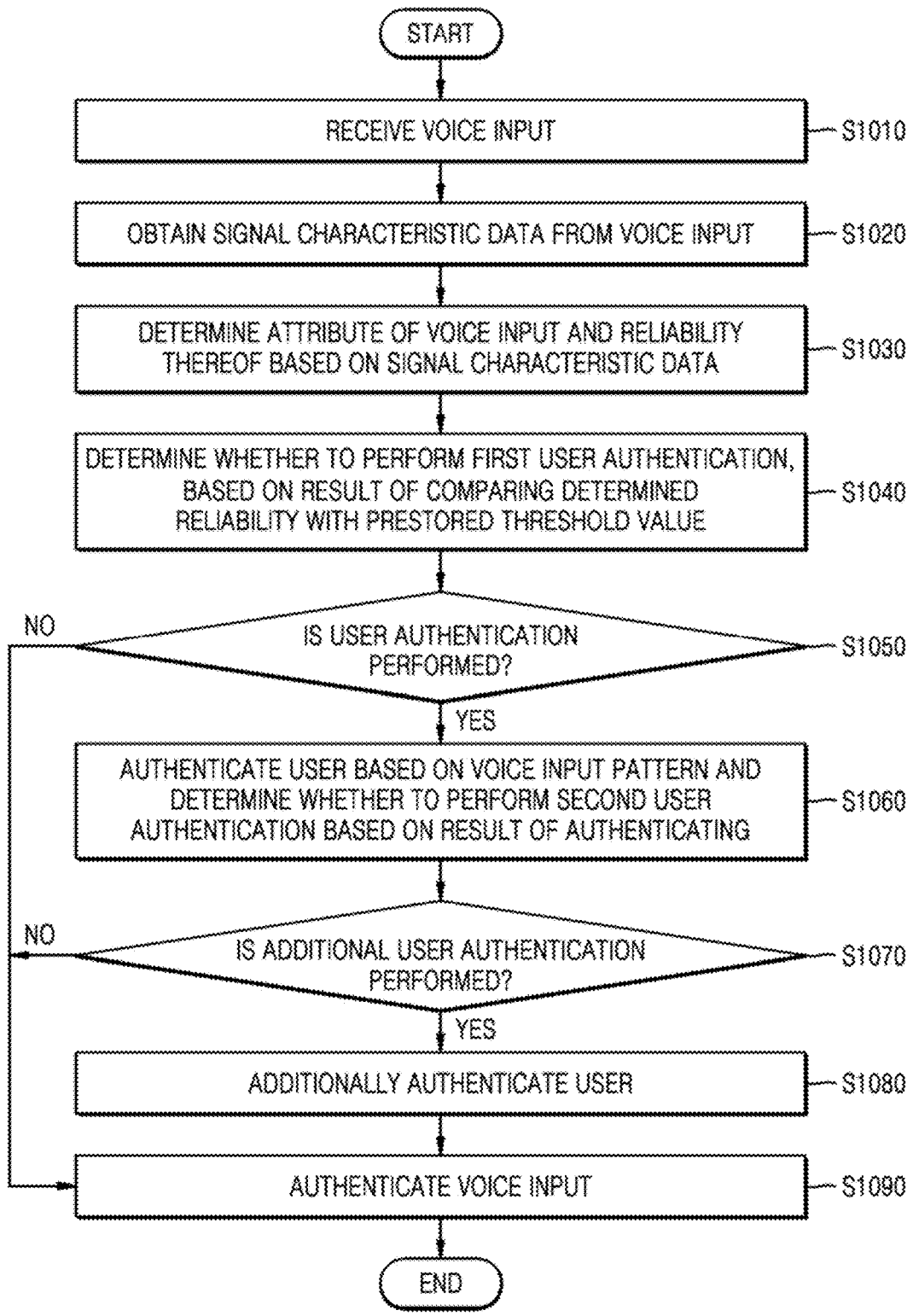
FIG. 10 is an exemplary flowchart for describing a method, performed by a device, of authenticating a voice input, according to some embodiments.

FIG. 10 is an exemplary flowchart for describing a method, performed by a device, of authenticating a voice input, according to some embodiments.

In operation S1010, a device 10 may receive a voice input. The device 10 may receive a voice input provided from a user by using at least one microphone.

In operation S1020, the device 10 may obtain signal characteristic data from the voice input. The signal characteristic data is data representing electrical signal characteristics of the voice input.

In operation S1030, the device 10 may determine an attribute of the voice input and reliability thereof based on the signal characteristic data. In an embodiment, the attribute of the voice input may indicate whether the voice input is uttered by a person, or whether the voice input is output by an apparatus. The reliability may be a probability that the determined attribute of the voice input will match an actual attribute.

In operations S1040 and S1050, the device 10 may determine whether to perform a first user authentication, based on a result of comparing the determined reliability with a prestored threshold value. For example, when the determined reliability is less than or equal to the threshold value, the device 10 may determine that the first user authentication is required.

In operations S1060 and S1070, when the device 10 determines that the user authentication is required, the device 10 may authenticate the user based on a voice input pattern. In the present embodiment, the voice input pattern represents a user's usage behavior of using the voice input through the device 10. In an embodiment, the device 10 may apply the voice input to a learning model and reject authentication for a user who attempts abnormal use. Also, the device 10 may determine whether to perform a second user authentication based on a result of the first user authentication. For example, when the user is not authenticated in the first user authentication, the device 10 may determine that a second user authentication is required.

In operation S1080, when the device 10 determines that the second user authentication is required, the device 10 may additionally authenticate the user.

In operation S1090, the device 10 may authenticate the voice input. For example, when the user is authenticated, the device 10 may authenticate the voice input even when the attribute of the voice input is determined with low reliability. When the user is not authenticated, the device 10 may not authenticate the voice input.

Figure 11:
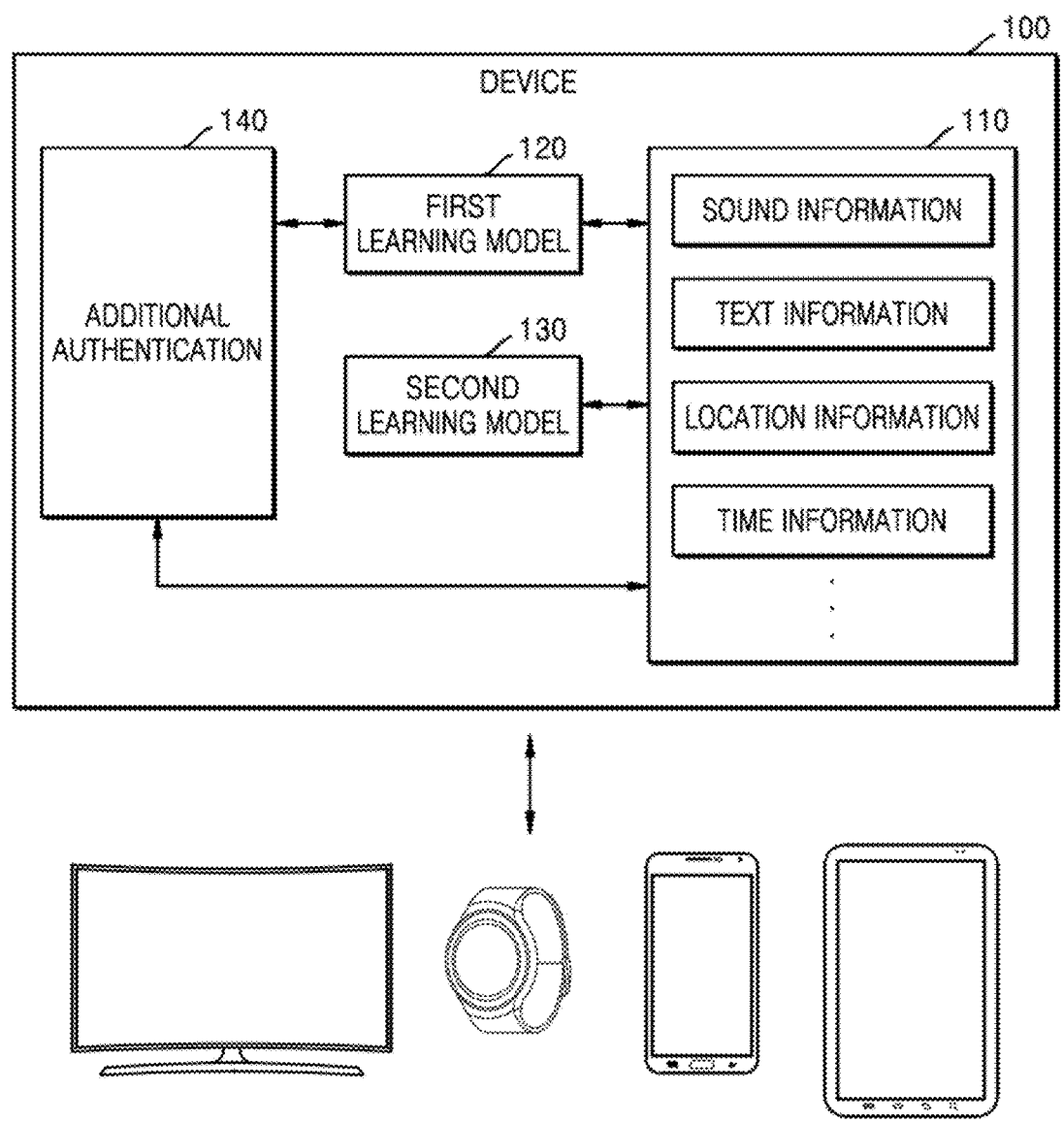
FIG. 11 is a diagram for describing functions of a device according to some embodiments.

FIG. 11 is a diagram for describing functions of a device 100, according to some embodiments.

The device 100 authenticates a voice input, based on an attribute of the voice input, by using a first learning model 120 trained based on signal characteristics. Thus, the device 100 may continuously detect and prevent an external attack using a voice output by an apparatus.

The device 100 authenticates a user, based on a user's behavior of using the voice input, by using a second learning model 130 trained based on a voice input pattern. Thus, the device 100 may additionally prevent an external attack using a voice uttered by a person other than the user.

Also, the device 100 may receive an additional input from the user and authenticate the user (140). Thus, when the user attempts an unusual voice input, the device 100 may effectively prevent an external attack using a voice uttered by a person other than the user, while authenticating the voice input.

The device 100 is connected to various external electronic devices and servers via a network. The device 100 may collect various pieces of information including context information from the connected devices and servers. The various pieces of information collected by the device 100 include at least one of sound information, text information, location information, and time information (110). The device 100 may train the first or second learning model 120 or 130 by using the collected pieces of information.

Figure 12:
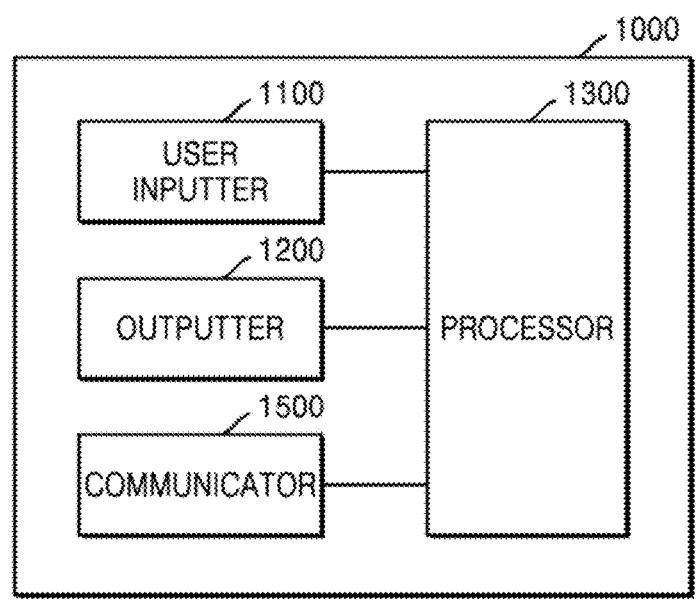
FIG. 12 is a block diagram of a device according to some embodiments.
Figure 13:
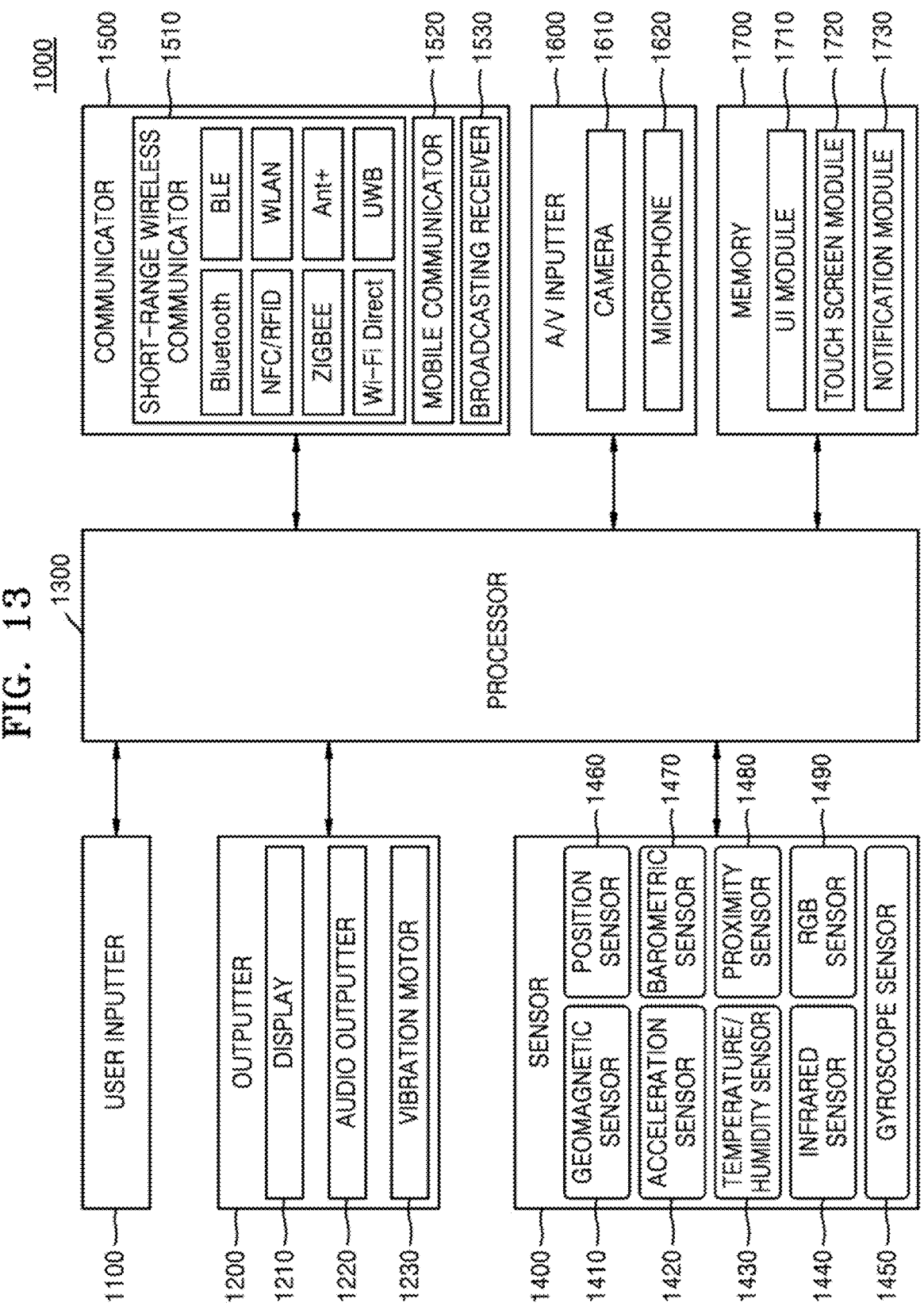
FIG. 13 is a block diagram of a device according to some embodiments.

FIGS. 12 and 13 are block diagrams of a device 1000 according to some embodiments.

As illustrated in FIG. 13, the device 1000 according to some embodiments may include a user inputter 1100, an outputter 1200, a processor 1300, and a communicator 1500. However, all the elements illustrated in FIG. 13 are not essential to the device 1000. The device 1000 may include more elements than those illustrated in FIG. 13 or may include fewer elements than those illustrated in FIG. 13.

For example, as illustrated in FIG. 13, the device 1000 according to some embodiments may further include, in addition to the user inputter 1100, the outputter 1200, the processor 1300, and the communicator 1500, a sensor 1400, an audio/video (A/V) inputter 1600, and a memory 1700.

The user inputter 1100 is a device that allows a user to input data for controlling the device 1000. For example, the user inputter 1100 may include a key pad, a dome switch, a touch pad (e.g., a touch-type capacitive touch pad, a pressure-type resistive touch pad, an infrared beam sensing type touch pad, a surface acoustic wave type touch pad, an integral strain gauge type touch pad, a piezo effect type touch pad, etc.), a jog wheel, a jog switch, and a microphone, but the present disclosure is not limited thereto. In an embodiment, the user inputter 1100 may include the A/V inputter 1600 illustrated in FIG. 13.

The user inputter 1100 may receive a voice input provided from a user.

The outputter 1200 may output an audio signal, a video signal, or a vibration signal. The outputter 1200 may include a display 1210, an audio outputter 1220, and a vibration motor 1230.

The display 1210 displays information processed by the device 1000. For example, the display 1210 may display a user interface (UI) that provides a voice input authentication result to a user.

When the display 1210 and the touch pad form a layer structure to constitute a touch screen, the display 1210 may also be used as an input device as well as an output device. The display 1210 may include at least one selected from liquid crystal display, thin-film transistor-liquid crystal display, organic light-emitting diode, flexible display, three-dimensional (3D) display, and electrophoretic display. The device 1000 may include two or more displays 1210 according to implementations of the device 1000. In this case, the two or more displays 1210 may be arranged to face each other by using a hinge.

The audio outputter 1220 outputs audio data that is received from the communicator 1500 or is stored in the memory 1700. Also, the audio outputter 1220 outputs an audio signal associated with the functions performed by the device 1000 (e.g., a call signal reception sound, a message reception sound, a notification sound, etc.). The audio outputter 1220 may include a speaker, a buzzer, and the like.

The vibration motor 1230 may output a vibration signal. For example, the vibration motor 1230 may output a vibration signal corresponding to the output of audio data or video data (e.g., a call signal reception sound, a message reception sound, etc.). Also, the vibration motor 1230 may output a vibration signal when a touch is input to a touch screen.

The processor 1300 controls overall operations of the device 1000. For example, the processor 1300 may execute programs stored in the memory 1700 to control overall operations of the user inputter 1100, the outputter 1200, the sensor 1400, the communicator 1500, and the AN inputter 1600.

Specifically, the processor 1300 may authenticate the received voice input and control the device 1000 or an electronic device connected thereto by using the voice input, based on a result of the authenticating.

In an embodiment, the processor 1300 may obtain signal characteristic data from the voice input. The signal characteristic data is data representing electrical signal characteristics of the voice input. In an embodiment, the signal characteristic data may be data analyzed based on at least one of a frequency, time, or power of the voice input. The processor 1300 may apply the signal characteristic data to a first learning model to determine an attribute of the voice input and the reliability thereof. In an embodiment, the attribute of the voice input may indicate whether the voice input is uttered by a person, or whether the voice input is output by an apparatus.

In an embodiment, the processor 1300 may determine whether a first user authentication is required, based on the determined reliability. The first user authentication is an operation of authenticating the user who utters the voice input, based on a user's voice input pattern. In the present embodiment, the voice input pattern represents a user's usage behavior of using the voice input.

When the processor 1300 determines that the first user authentication is required, the processor 1300 may authenticate the user by applying the voice input to a second learning model. When the authentication, which is performed by the first user authentication, is rejected or difficult to determine, the processor 1300 may determine that the second user authentication is required, and may additionally authenticate the user.

The sensor 1400 may detect a state of the device 1000 or a state around the device 1000 and transmit detected information to the processor 1300.

The sensor 1400 may include at least one of a geomagnetic sensor 1410, an acceleration sensor 1420, a temperature/humidity sensor 1430, an infrared sensor 1440, a gyroscope sensor 1450, a position sensor (e.g., global positioning system (GPS)) 1460, a barometric sensor 1470, a proximity sensor 1480, and an RGB sensor (illuminance sensor) 1490, but the present disclosure is not limited thereto. Because the functions of the respective sensors may be intuitively inferred from their names, detailed descriptions thereof will be omitted.

The communicator 1500 may include one or more elements for communication between the device 1000 and a head mounted display (HMD) device or communication between the device 1000 and a server. For example, the communicator 1500 may include a short-range wireless communicator 1510, a mobile communicator 1520, and a broadcasting receiver 1530.

The short-range wireless communicator 1510 may include a Bluetooth communicator, a Bluetooth Low Energy (BLE) communicator, a near field communicator, a wireless local area network (WLAN) (Wi-Fi) communicator, a Zigbee communicator, an infrared data association (IrDA) communicator, a Wi-Fi direct (WFD) communicator, an ultra wideband (UWB) communicator, an Ant+ communicator, and the like, but the present disclosure is not limited thereto.

The mobile communicator 1520 may transmit and receive a wireless signal with at least one of a base station, an external terminal, or a server on a mobile communication network. Examples of the wireless signal may include a voice call signal, a video call signal, and various types of data according to transmission or reception of text/multimedia messages.

The broadcasting receiver 1530 may receive a broadcasting signal and/or broadcasting-related information from the outside via a broadcasting channel. The broadcasting channel may include a satellite channel, a ground wave channel, or the like. The device 1000 may not include the broadcasting receiver 1530 according to an implementation example.

Also, the communicator 1500 may transmit and receive information for using context information with an HMD device, a server, and a peripheral device.

The A/V inputter 1600 may be provided for input of an audio signal or a video signal. For the input of the audio signal or the video signal, the A/V inputter 1600 may include a camera 1610, a microphone 1620, and the like. The camera 1610 may obtain an image frame, such as a still image or a moving image, through an image sensor in a video call mode or an image capture mode. An image captured by the image sensor may be processed by the processor 1300 or a separate image processor (not illustrated).

The image frame processed by the camera 1610 may be stored in the memory 1700 or may be transmitted to the outside through the communicator 1500. Alternatively, the image frame may be used for the operation, performed by the processor 1300, of determining a voice activation condition and a voice deactivation condition. The camera 1610 may include two or more cameras according to a configuration of a terminal.

The microphone 1620 receives a voice input. Also, the microphone 1620 receives an external audio signal and processes the external audio signal into electrical voice data. For example, the microphone 1620 may receive an audio signal from an external device or a person. The microphone 1620 may use various noise cancellation algorithms for cancelling noise generated in a process of receiving an external audio signal including a voice input.

The memory 1700 may store programs for processing and control of the processor 1300 and may store data input to the device 1000 or data output from the device 1000.

The memory 1700 may include at least one type of storage medium selected from among a flash memory type, a hard disk type, a multimedia card micro type, a card type memory (e.g., secure digital (SD) or extreme digital (XD) memory, etc.), random access memory (RAM), static random access memory (SRAM), read-only memory (ROM), electrically erasable programmable ROM (EEPROM), programmable ROM (PROM), magnetic memory, magnetic disk, and optical disk.

The programs stored in the memory 1700 may be classified into a plurality of modules according to functions thereof. For example, the programs may be classified into a UI module 1710, a touch screen module 1720, and a notification module 1730.

The UI module 1710 may provide a specialized UI or graphics user interface (GUI) that interoperates with the device 1000 according to each application. The touch screen module 1720 may detect a user's touch gesture on a touch screen and transmit information about the touch gesture to the processor 1300. The touch screen module 1720 according to some embodiments may recognize and analyze a touch code. The touch screen module 1720 may be implemented as separate hardware including a controller.

Various sensors may be provided inside or near the touch screen so as to detect a touch on the touch screen or hovering above the touch screen. An example of the sensor that detects the touch on the touch screen may be a tactile sensor. The tactile sensor may detect a contact of a specific object at or beyond a sensitivity of a person. The tactile sensor may sense various pieces of information, such as roughness of a contact surface, hardness of a contact object, or a temperature of a contact point.

Also, an example of the sensor that detects the touch on the touch screen may be a proximity sensor.

The proximity sensor refers to a sensor that detects the presence or absence of an object approaching a certain detection surface or an object existing near the sensor by using an electromagnetic force or infrared light, without mechanical contact. Examples of the proximity sensor include a transmission-type photoelectric sensor, a direct reflection-type photoelectric sensor, a mirror reflection-type photoelectric sensor, a high frequency oscillation-type proximity sensor, a capacity-type proximity sensor, a magnetic proximity sensor, and an infrared-type proximity sensor. The user's touch gesture may include a tap, a touch-and-hold, a double-tap, a drag, a panning, a flick, a drag-and-drop, a swipe, and the like.

The notification module 1730 may output a signal for notifying that an event occurs in the device 1000. Examples of events occurring in the device 1000 include a call signal reception, a message reception, a key signal input, and a schedule notification. The notification module 1730 may output a notification signal through the display 1210 in the form of a video signal. The notification module 1730 may output a notification signal through the audio outputter 1220 in the form of an audio signal. The notification module 1730 may output a notification signal through the vibration motor 1230 in the form of a vibration signal.

Figure 14:
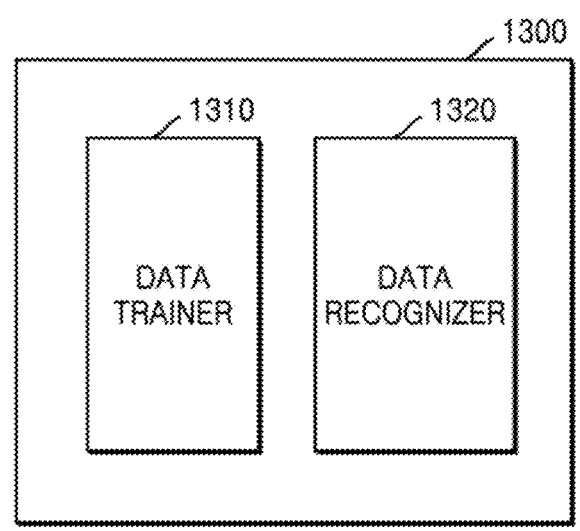
FIG. 14 is a block diagram of a processor according to some embodiments.

FIG. 14 is a block diagram of the processor 1300 according to some embodiments.

Referring to FIG. 14, the processor 1300 according to some embodiments may include a data trainer 1310 and a data recognizer 1320.

According to an embodiment, at least part of the data trainer 1310 and at least part of the data recognizer 1320 may be implemented as a software module, or may be manufactured in the form of a hardware chip and may be mounted on a device.

The data trainer 1310 may learn a criterion for determining the attribute of the voice input and the reliability thereof. The data trainer 1310 may learn a criterion regarding which data is to be used for determining the attribute of the voice input and the reliability thereof and authenticating the voice input. Also, the data trainer 1310 may learn a criterion regarding a method of determining the voice input by using the provided data, a method of determining the reliability thereof, and a method of authenticating the voice input. The data trainer 1310 may learn a criterion for determining the attribute of the voice input and the reliability thereof by obtaining data to be used for learning and applying the obtained data to a data recognition model to be described below.

Also, the data trainer 1310 may learn a criterion for authenticating the user based on a voice input pattern. The data trainer 1310 may learn a criterion regarding which context data is to be used for authenticating the user. Also, the data trainer 1310 may learn a criterion regarding a method of authenticating the user by using the provided context data. The data trainer 1310 may learn a criterion for authenticating the user by obtaining data to be used for learning and applying the obtained data to a data recognition model to be described below.

The data trainer 1310 may provide the functions of the learning models used by the device in FIGS. 1 to 10, and the functions of the learning models used by the device in FIGS. 1 to 10 may be implemented by one or more data trainers 1310.

The data recognizer 1320 may determine the attribute of the voice input and the reliability thereof based on data, or may authenticate the user. The data recognizer 1320 may determine the attribute of the voice input and the reliability thereof from certain data by using the trained data recognition model, or may authenticate the user. The data recognizer 1320 may obtain certain data according to a preset criterion obtained by learning and use the data recognition model by using the obtained data as an input value. Also, the data recognizer 1320 may use the data recognition model to determine the attribute of the voice input and the reliability thereof based on certain data, or may authenticate the user. Also, a result value output by the data recognition model using the obtained data as the input value may be used to update the data recognition model.

At least one of the data trainer 1310 and the data recognizer 1320 may be manufactured in the form of at least one hardware chip and mounted on the device 1000. For example, at least one of the data trainer 1310 and the data recognizer 1320 may be manufactured in the form of a dedicated hardware chip for AI, or may be manufactured as part of an existing general-purpose processor (e.g., central processing unit (CPU) or application processor) or a dedicated graphics processor (e.g., graphics processing unit (GPU)) and mounted on the device 1000. In this case, the dedicated hardware chip for AI is a dedicated processor specialized for probability calculation. Because the dedicated hardware chip has higher parallel processing performance than that of the existing general-purpose processor, it is possible to quickly process computational operations in an AI field such as machine learning.

The data trainer 1310 and the data recognizer 1320 may be mounted on a single device, or may be respectively mounted on separate devices. For example, one of the data trainer 1310 and the data recognizer 1320 may be included in the single device, and the other thereof may be included in the server. Also, model information constructed by the data trainer 1310 may be provided to the data recognizer 1320 through wired or wireless communication, and data input to the data recognizer 1320 may be provided to the data trainer 1310 as additional training data.

At least one of the data trainer 1310 and the data recognizer 1320 may be implemented as at least one software module. When at least one of the data trainer 1310 and the data recognizer 1320 is implemented as a software module (or a program module including instructions), the software module may be stored in a non-transitory computer-readable medium. Also, in this case, at least one software module may be provided by an operating system (OS) or may be provided by a certain application. Alternatively, part of at least one software module may be provided by an OS, and the remaining part thereof may be provided by a certain application.

Figure 15:
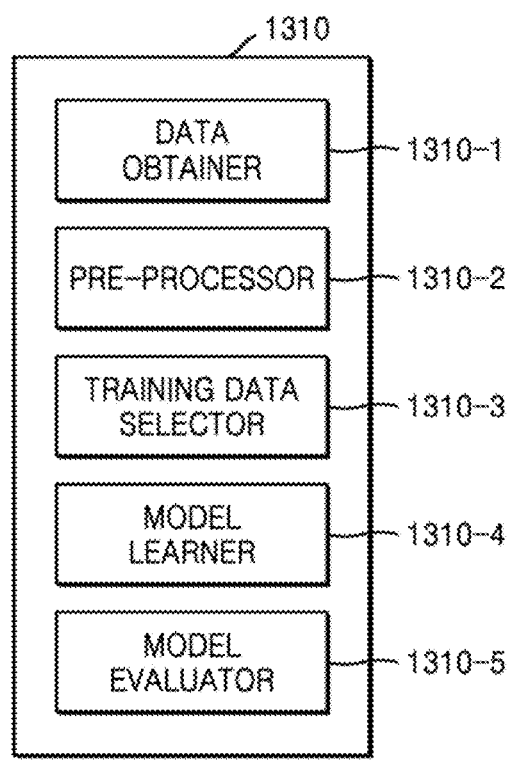
FIG. 15 is a block diagram of a data trainer according to some embodiments.

FIG. 15 is a block diagram of the data trainer 1310 according to some embodiments.

Referring to FIG. 15, the data trainer 1310 according to some embodiments may include a data obtainer 1310-1, a pre-processor 1310-2, a training data selector 1310-3, a model learner 1310-4, and a model evaluator 1310-5.

The data obtainer 1310-1 may determine the attribute of the voice input and the reliability thereof, or may obtain data necessary for authenticating the user. The data obtainer 1310-1 may obtain, for example, a certain user voice and context information.

The pre-processor 1310-2 may pre-process the obtained data such that the obtained data is to be used for learning for determining the attribute of the voice input and the reliability thereof or authenticating the user. The pre-processor 1310-2 may process the obtained data into a preset format such that the model learner 1310-4 to be described below is enabled to use the obtained data for learning for determining the attribute of the voice input and the reliability thereof or authenticating the user.

The training data selector 1310-3 may select data necessary for learning from among pieces of pre-processed data. The selected data may be provided to the model learner 1310-4. The training data selector 1310-3 may select data necessary for learning from among pieces of pre-processed data according to a preset criterion for determining the attribute of the voice input and the reliability thereof or authenticating the user. Also, the training data selector 1310-3 may select data according to a preset criterion by learning performed by the model learner 1310-4 to be described below.

The model learner 1310-4 may learn a criterion for determining the attribute of the voice input and the reliability thereof based on the training data, or authenticating the user. Also, the model learner 1310-4 may learn a criterion regarding which training data is to be used for determining the attribute of the voice input and the reliability thereof, or authenticating the user Also, the model learner 1310-4 may use the training data to train the data recognition model used for determining the attribution of the voice input and the reliability thereof or authenticating the user. In this case, the data recognition model may be a pre-constructed model. For example, the data recognition model may be a model that is pre-constructed by receiving basic training data (e.g., sample data, etc.).

The data recognition model may be constructed considering the application field of the recognition model, the purpose of learning, the computer performance of the device, or the like. The data recognition model may be designed to simulate a human brain structure on a computer. The data recognition model may include a plurality of network nodes having weights, which simulate neurons of a human neural network. The network nodes may form a connection relationship such that the neurons simulate the synaptic activity of the neurons that exchange signals through synapses. The data recognition model may include, for example, a neural network model, or a deep learning model developed from the neural network model. In the deep learning model, a plurality of network nodes may be located at different depths (or layers) and exchange data according to a convolutional connection relationship. For example, the data recognition model may include models such as a deep neural network (DNN), a recurrent neural network (RNN), or a bidirectional recurrent deep neural network (BRDNN), but the present disclosure is not limited thereto.

According to various embodiments, when there are a plurality of pre-constructed recognition models, the model learner 1310-4 may determine, as a data recognition model to be learned, a data recognition model having a large correlation between input training data and basic training data. In this case, the basic training data may be previously classified for each data type, and the data recognition model may be pre-constructed for each data type. For example, the basic training data may be previously classified based on various criteria such as a region in which the training data is generated, a time at which the training data is generated, a size of the training data, a genre of the training data, a creator of the training data, and a type of an object in the training data.

Also, the model learner 1310-4 may learn the data recognition model by using, for example, a learning algorithm including error back-propagation or gradient descent.

Also, the model learner 1310-4 may learn the data recognition model through, for example, supervised learning using the training data as the input value. Also, the model learner 1310-4 may self-learn the type of data necessary for determining the situation without separate supervision, so as to learn the data recognition model through unsupervised learning that finds a criterion for determining the situation. Also, the model learner 1310-4 may learn the data recognition model through, for example, reinforcement learning using a feedback on whether a result of determining a situation according to learning is correct.

Also, when the data recognition model is learned, the model learner 1310-4 may store the learned data recognition model. In this case, the model learner 1310-4 may store the learned data recognition model in the memory of the electronic device including the data recognizer 1320. Alternatively, the model learner 1310-4 may store the learned data recognition model in the memory of the electronic device including the data recognizer 1320, which is to be described below. Alternatively, the model learner 1310-4 may store the learned data recognition model in a memory of a server connected to the electronic device via a wired or wireless network.

In this case, the memory in which the learned data recognition model is stored may also store, for example, commands or data associated with at least one other element of the electronic device. Also, the memory may store software and/or programs. The programs may include, for example, kernel, middleware, application programming interface (API), and/or application programs (or "applications").

When evaluation data is input to the data recognition model and a recognition result output from the evaluation data does not satisfy a certain criterion, the model evaluator 1310-5 may cause the model learner 1310-4 to learn again. In this case, the evaluation data may be data preset for evaluating the data recognition model.

For example, when the number or ratio of evaluation data, an analysis result of which is inaccurate among analysis results of the learned data recognition model for the evaluation data, exceeds a preset threshold value, the model evaluator 1310-5 may evaluate that the certain criterion is not satisfied. For example, in a case in which the certain criterion is defined as a ratio of 2%, when the learned data recognition model outputs an incorrect recognition result for more than 20 pieces of evaluation data among a total of 1,000 pieces of evaluation data, the model evaluator 1310-5 may evaluate that the learned data recognition model is unsuitable.

When there are a plurality of learned data recognition models, the model evaluator 1310-5 may evaluate whether each learned data recognition model satisfies the certain criterion and determine a model satisfying the certain criterion as a final data recognition model. In this case, when there are a plurality of models satisfying the certain criterion, the model evaluator 1310-5 may determine, as the final data recognition model, any one model or a certain number of models that are preset in the descending order of evaluation scores.

At least one of the data obtainer 1310-1, the pre-processor 1310-2, the training data selector 1310-3, the model learner 1310-4, and the model evaluator 1310-5 in the data trainer 1310 may be manufactured in the form of a hardware chip and mounted on the electronic device. For example, at least one of the data obtainer 1310-1, the pre-processor 1310-2, the training data selector 1310-3, the model learner 1310-4, and the model evaluator 1310-5 may be manufactured in the form of a dedicated hardware chip for AI, or may be manufactured as part of an existing general-purpose processor (e.g., CPU or application processor) or a dedicated graphics processor (e.g., GPU), and may be mounted on the above-described various electronic devices.

Also, the data obtainer 1310-1, the pre-processor 1310-2, the training data selector 1310-3, the model learner 1310-4, and the model evaluator 1310-5 may be mounted on the single electronic device or may be respectively mounted on separate electronic devices. For example, some of the data obtainer 1310-1, the pre-processor 1310-2, the training data selector 1310-3, the model learner 1310-4, and the model evaluator 1310-5 may be included in the electronic device, and the others thereof may be included in the server.

Also, at least one of the data obtainer 1310-1, the pre-processor 1310-2, the training data selector 1310-3, the model learner 1310-4, and the model evaluator 1310-5 may be implemented as a software module. When at least one of the data obtainer 1310-1, the pre-processor 1310-2, the training data selector 1310-3, the model learner 1310-4, and the model evaluator 1310-5 is implemented as a software module (or a program module including instructions), the software module may be stored in a non-transitory computer-readable medium. Also, in this case, at least one software module may be provided by an operating system (OS) or may be provided by a certain application. Alternatively, part of at least one software module may be provided by an OS, and the remaining part thereof may be provided by a certain application.

Figure 16:
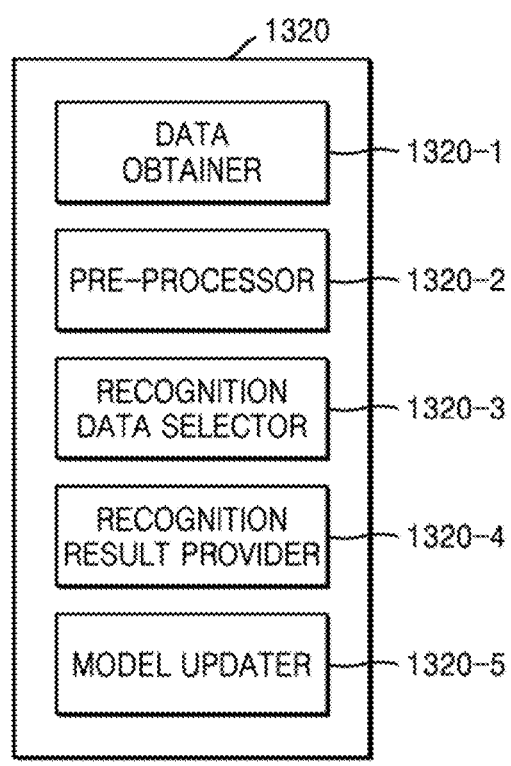
FIG. 16 is a block diagram of a data recognizer according to some embodiments.

FIG. 16 is a block diagram of the data recognizer 1320 according to some embodiments.

Referring to FIG. 16, the data recognizer 1320 according to some embodiments may include a data obtainer 1320-1, a pre-processor 1320-2, a recognized data selector 1320-3, a recognition result provider 1320-4, and a model updater 1320-5.

The data obtainer 1320-1 may obtain data necessary for determining an attribution of a voice input and reliability thereof or authenticating a user, and the pre-processor 1320-2 may pre-process the obtained data such that the data obtained for determining the attribution of the voice input and the reliability thereof or authenticating the user is used. The pre-processor 1320-2 may process the obtained data into a preset format such that the recognition result provider 1320-4 to be described below is enabled to use the obtained data for determining the attribute of the voice input and the reliability thereof or authenticating the user.

The recognition data selector 1320-3 may select data necessary for determining the attribute of the voice input and the reliability thereof among the pieces of pre-processed data or authenticating the user. The selected data may be provided to the recognition result provider 1320-4. The recognition data selector 1320-3 may select all or part of the pre-processed data according to a preset criterion for determining the attribute of the voice input and the reliability thereof or authenticating the user. Also, the recognition data selector 1320-3 may select data according to a preset criterion by learning performed by the model learner 1310-4 to be described below.

The recognition result provider 1320-4 may apply the selected data to the data recognition model to determine the attribute of the voice input and the reliability thereof or authenticate the user. The recognition result provider 1320-4 may provide a recognition result according to a data recognition purpose. The recognition result provider 1320-4 may apply the selected data to the data recognition model by using the data selected by the recognition data selector 1320-3 as an input value. Also, the analysis result may be determined by the data recognition model.

The model updater 1320-5 may update the data recognition model based on the evaluation of the recognition result provided by the recognition result provider 1320-4. For example, the model updater 1320-5 may provide, to the model learner 1310-4, the recognition result provided by the recognition result provider 1320-4, such that the model learner 1310-4 updates the data recognition model.

At least one of the data obtainer 1320-1, the pre-processor 1320-2, the recognition data selector 1320-3, the recognition result provider 1320-4, and the model updater 1320-5 in the data recognizer 1320 may be manufactured in the form of a hardware chip and mounted on the electronic device. For example, at least one of the data obtainer 1320-1, the pre-processor 1320-2, the recognition data selector 1320-3, the recognition result provider 1320-4, and the model updater 1320-5 may be manufactured in the form of a dedicated hardware chip for AI, or may be manufactured as part of an existing general-purpose processor (e.g., CPU or application processor) or a dedicated graphics processor (e.g., GPU) and mounted on the above-described various electronic devices.

Also, the data obtainer 1320-1, the pre-processor 1320-2, the recognition data selector 1320-3, the recognition result provider 1320-4, and the model updater 1320-5 may be mounted on the single electronic device or may be respectively mounted on separate electronic devices. For example, some of the data obtainer 1320-1, the pre-processor 1320-2, the recognition data selector 1320-3, the recognition result provider 1320-4, and the model updater 1320-5 may be included in the electronic device, and the others thereof may be included in the server.

Also, at least one of the data obtainer 1320-1, the pre-processor 1320-2, the recognition data selector 1320-3, the recognition result provider 1320-4, and the model updater 1320-5 may be implemented as a software module. When at least one of the data obtainer 1320-1, the pre-processor 1320-2, the recognition data selector 1320-3, the recognition result provider 1320-4, and the model updater 1320-5 is implemented as a software module (or a program module including instructions), the software module may be stored in a non-transitory computer-readable medium. Also, in this case, at least one software module may be provided by an OS or may be provided by a certain application. Alternatively, part of at least one software module may be provided by an OS, and the remaining part thereof may be provided by a certain application.

Figure 17:
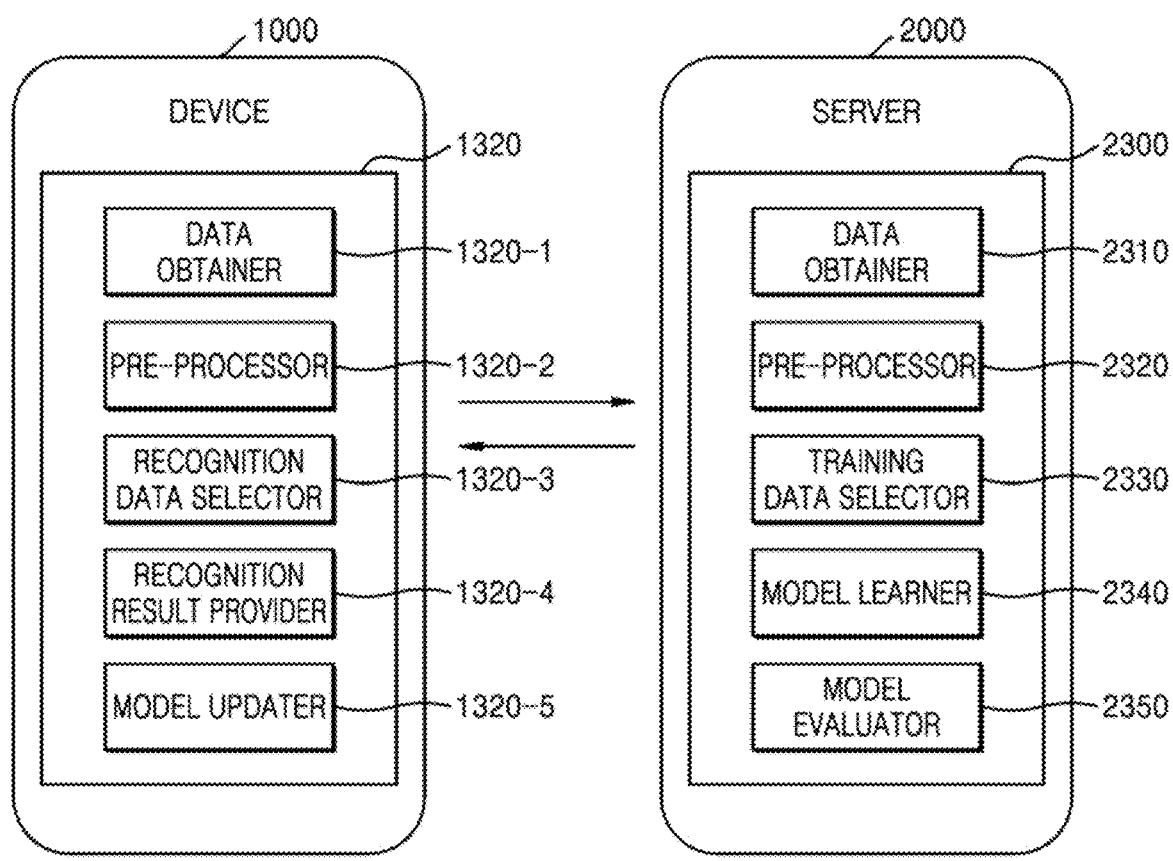
FIG. 17 is a diagram illustrating an example in which a device and a server interoperate with each other to train and recognize data, according to some embodiments.

FIG. 17 is a diagram illustrating an example in which a device 1000 and a server 2000 interoperate with each other to train and recognize data, according to some embodiments.

Referring to FIG. 17, the server 2000 may learn a criterion for determining an attribute of a voice input and reliability thereof or authenticating a user, and the device 1000 may determine the attribute of the voice input and the reliability thereof or authenticate the user, based on a result of the learning performed by server 2000.

In this case, a model learner 2340 of the server 2000 may perform the function of the data trainer 1310 illustrated in FIG. 15. A model learner 2340 of the server 2000 may learn a criterion regarding which data is to be used for determining voice activation and deactivation conditions and generating recommended voice text information. Also, the model learner 2340 of the server 2000 may learn a criterion for determining the voice activation and deactivation conditions and generating the recommended voice text information by using data. The model learner 2340 may learn a criterion for determining the attribute of the voice input and the reliability thereof or authenticating the user by obtaining data to be used for learning and applying the obtained data to a data recognition model to be described below.

Also, a recognition result provider 1320-4 of the device 1000 may determine the attribute of the voice input and the reliability thereof or authenticate the user by applying the data selected by a recognition data selector 1320-3 to a data recognition model generated by the server 2000. For example, the recognition result provider 1320-4 may transmit the data selected by the recognition data selector 1320-3 to the server 2000, and the server 2000 may determine the attribute of the voice input and the reliability thereof or authenticate the user by applying the data selected by the recognition data selector 1320-3 to the recognition model. Also, the recognition result provider 1320-4 may receive, from the server 2000, information about the determination of the attribute of the voice input and the reliability thereof, determined by the server 2000, or the authentication of the user.

Alternatively, the recognition result provider 1320-4 of the device 1000 may receive, from the server 2000, the recognition model generated by the server 2000 and may use the received data recognition model to determine the attribute of the voice input and the reliability thereof or authenticate the user. In this case, the recognition result provider 1320-4 of the device 1000 may determine the attribute of the voice input and the reliability thereof or authenticate the user by applying the data selected by the recognition data selector 1320-3 to the data recognition model received from the server 2000.

Also, the device 1000 and the server 2000 may effectively distribute and perform operations for the learning of the data recognition model and the data recognition. In this manner, data processing may be efficiently performed so as to provide a service matching a user's intention and a user's privacy may be effectively protected.

Some embodiments of the present disclosure may be implemented as a software program that includes instructions stored in a computer-readable storage medium.

For example, a computer is a device capable of calling the stored instructions from the storage medium and performing the operations of the embodiments according to the called instructions. The computer may include the device according to the embodiments or an external server communicatively connected to the device.

The computer-readable storage medium may be provided in the form of a non-transitory storage medium. The term "non-transitory" means that the storage media does not include a signal or current and is tangible, and does not distinguish between semi-permanent and temporary storage of data in the storage medium. For example, the non-transitory storage medium may include not only a non-transitory readable storage medium such as compact disc (CD), digital versatile disc (DVD), hard disk, Blu-ray disk, universal serial bus (USB), internal memory, memory card, ROM, or RAM, but also a temporary storage medium such as register, cache, or buffer.

Also, the methods according to the embodiments may be provided as a computer program product.

The computer program product may include a software program, a computer-readable storage medium on which the software program is stored, or a product traded between a seller and a buyer.

For example, the computer program product may include a product (e.g., downloadable app) of a software program form that is distributed electronically through a device manufacturer or an electronic market (e.g., Google Play Store, App Store, etc.). For electronic distribution, at least part of the software program may be stored in a storage medium or may be temporarily generated. In this case, the storage medium may be a server of a manufacturer or an electronic market, or a storage medium of a relay server.

The invention claimed is:

1. A device for authenticating a voice input provided from a user, the device comprising:

a microphone configured to receive the voice input;
a memory configured to store one or more instructions; and
a processor configured to execute the one or more instructions,
wherein the processor is further configured to execute the one or more instructions to:
  obtain, from the voice input, signal characteristic data representing signal characteristics of the voice input;
  apply the obtained signal characteristic data to a first learning model configured to determine whether an attribute of the voice input corresponds to a voice uttered by a person and a voice output by an apparatus;
  obtain context information including at least one of device state information, user's device usage history information, and user schedule information; and
  based on a reliability score of determining that the attribute of the voice input corresponds to the voice uttered by the person, determine whether a user authentication is required;
  when the user authentication is required, apply the voice input and the context information to a second learning model to authenticate the user; and
  based on a result of the user authentication, authenticate the voice input.

2. The device of claim 1, wherein the signal characteristic data comprises information about a per-frequency cumulative power of the voice input.

3. The device of claim 2, wherein the first learning model is trained to determine the attribute of the voice input differently according to per-frequency cumulative powers of the voice uttered by the person and the voice output by the apparatus.

4. The device of claim 1, wherein the processor is further configured to execute the one or more instructions to:
  obtain a voice input pattern of the user;
  wherein the voice input pattern is determined based on the voice input which is input by the user or a situation in which the voice input is input; and
  apply the voice input pattern to the second learning model configured to authenticate the voice input.

5. The device of claim 4, wherein the voice input pattern comprises a user's usage behavior of inputting voice.

6. The device of claim 1, wherein the context information comprises the device state information, and the device state information comprises information of at least one of an operation mode of the device, a location of the device, a communication module activation state of the device, and a network connection state of the device.

7. The device of claim 1, wherein the context information comprises the user's device usage history information, and the user's device usage history information comprises at least one of an application usage history, a user's call history, a user's text history, and a usage frequency of a voice recognition function.

8. The device of claim 1, wherein the processor is further configured to execute the one or more instructions to:
  output a plurality of preset words that are randomly selected by the device;
  receive a cipher text including the plurality of preset words from the user; and
  additionally authenticate the voice input based on comparison between the received cipher text and a preset cipher text.

9. The device of claim 1, wherein the context information comprises an operation mode of the device that corresponds to a sound mode, a vibration mode, and a silent mode.

10. The device of claim 1, wherein the context information comprises a communication module activation state of the device that indicates whether Wi-Fi is turned on or not, and whether Bluetooth is turned on or not.

11. A method of authenticating a voice input provided from a user, the method comprising:
  receiving the voice input;
  obtaining, from the voice input, signal characteristic data representing signal characteristics of the voice input; and
  authenticating the voice input by applying the obtained signal characteristic data to a first learning model configured to determine whether an attribute of the voice input corresponds to a voice uttered by a person or a voice output by an apparatus,
  obtaining context information including at least one of device state information, user's device usage history information, and user schedule information,
  based on a reliability of determining that the attribute of the voice input corresponds to the voice uttered by the person, determining whether a user authentication is required;
  when the user authentication is required, applying the voice input and the context information to a second learning model to authenticate the user; and
  based on a result of the user authentication, authenticating the voice input.

12. The method of claim 11, wherein the signal characteristic data comprises information about a per-frequency cumulative power of the voice input.

13. The method of claim 12, wherein the first learning model is trained to determine the attribute of the voice input differently according to per-frequency cumulative powers of the voice uttered by the person and the voice output by the apparatus.

14. The method of claim 11, further comprising authenticating the user by,
  obtaining a voice input pattern of the user;
  wherein the voice input pattern is determined based on the voice input which is input by the user or a situation in which the voice input is input;
  applying the voice input pattern to the second learning model configured to authenticate the voice input.

15. The method of claim 14, wherein the voice input pattern comprises a user's usage behavior of inputting voice.

16. The method of claim 11, wherein the context information comprises the device state information, and
  the device state information comprises information of at least one of an operation mode of the device, a location of the device, a communication module activation state of the device, and a network connection state of the device.

17. The method of claim 11, wherein the context information comprises the user's device usage history information, and the user's device usage history information comprises at least one of an application usage history, a user's call history, a user's text history, and a usage frequency of a voice recognition function.

18. A non-transitory computer readable medium configured to store instructions, wherein execution of the instructions by one or more processors of a computer are configured to cause the computer to:
  obtain, from a voice input, signal characteristic data representing signal characteristics of the voice input;
  apply the obtained signal characteristic data to a first learning model configured to determine whether an attribute of the voice input corresponds to a voice uttered by a person or a voice output by an apparatus;

obtain context information including at least one of device state information, user's device usage history information, and user schedule information;

based on a reliability score of determining that the attribute of the voice input corresponds to the voice uttered by the person, determine whether a user authentication is required;

when the user authentication is required, apply the voice input and the context information to a second learning model to authenticate the user; and based on a result of the user authentication, authenticate the voice input.

* * * * *

UNITED STATES PATENT AND TRADEMARK OFFICE
CERTIFICATE OF CORRECTION

| | |
|---|---|
| PATENT NO. | : 11,551,699 B2 |
| APPLICATION NO. | : 17/052736 |
| DATED | : January 10, 2023 |
| INVENTOR(S) | : Junho Huh et al. |

It is certified that error appears in the above-identified patent and that said Letters Patent is hereby corrected as shown below:

On the Title Page

(72) Inventors; Please delete the second Inventor "Hyoungshik Kim" and replace with -- Hyoungshick Kim --

Signed and Sealed this
Fourteenth Day of May, 2024

Katherine Kelly Vidal
*Director of the United States Patent and Trademark Office*